(12) United States Patent
Agarwal

(10) Patent No.: US 11,783,087 B1
(45) Date of Patent: Oct. 10, 2023

(54) FACILITATING SECURE CLIENT DATA TRANSFER

(71) Applicant: Shape Security, Inc., Santa Clara, CA (US)

(72) Inventor: Sumit Agarwal, Palo Alto, CA (US)

(73) Assignee: Shape Security, Inc., Seattle, WA (US)

( * ) Notice: Subject to any disclaimer, the term of this patent is extended or adjusted under 35 U.S.C. 154(b) by 247 days.

(21) Appl. No.: 17/071,483

(22) Filed: Oct. 15, 2020

Related U.S. Application Data

(60) Provisional application No. 62/915,626, filed on Oct. 15, 2019.

(51) Int. Cl.
*H04L 9/40* (2022.01)
*G06F 21/60* (2013.01)
*G06F 21/62* (2013.01)

(52) U.S. Cl.
CPC ........ *G06F 21/6263* (2013.01); *G06F 21/606* (2013.01); *H04L 63/0428* (2013.01); *H04L 63/083* (2013.01)

(58) Field of Classification Search
CPC ............... G06F 21/6263; G06F 21/606; H04L 63/0428; H04L 63/083
USPC .......................................................... 726/26
See application file for complete search history.

(56) References Cited

U.S. PATENT DOCUMENTS

| | | | | |
|---|---|---|---|---|
| 7,137,139 B1* | 11/2006 | Smith | .................. | H04L 41/0253 713/170 |
| 9,105,178 B2* | 8/2015 | Carlson | ................. | G06F 16/951 |
| 11,163,875 B1* | 11/2021 | Roundy | ................... | G06F 21/56 |
| 11,258,819 B1* | 2/2022 | Agarwal | ............. | H04L 63/1425 |
| 2003/0028427 A1* | 2/2003 | Dutta | .................. | G06Q 30/0207 705/14.1 |
| 2010/0242094 A1* | 9/2010 | Hussain | ................ | G06F 21/564 726/4 |
| 2014/0089499 A1* | 3/2014 | Zao | ........................ | H04L 67/306 709/224 |
| 2020/0371859 A1* | 11/2020 | Sayyed | ..................... | G06F 8/65 |

OTHER PUBLICATIONS

IntegraTag: A Framework for High-Fidelity Web Client Measurement, Thomas et al, Sep. 2016 (Year: 2016).*

* cited by examiner

*Primary Examiner* — Jahangir Kabir
(74) *Attorney, Agent, or Firm* — Troutman Pepper Hamilton Sanders LLP (F5 PATENTS)

(57) ABSTRACT

This technology receive first telemetry data collected at the client when first instrumentation code provided to the client during a first interaction with a first server is executed at the client. The first telemetry data is stored in a telemetry data set comprising telemetry data for one or more interactions between a plurality of clients and a plurality of servers. Second telemetry data, collected at the client when the second instrumentation code provided to the client during a second interaction with a second server is executed at the client, is received. Based on the second telemetry data, determining when the telemetry data set includes stored telemetry data for an interaction between the client and the first server. A transfer of data associated with the client and the first server to the second interaction is facilitated when the determination indicates the telemetry data set includes the stored telemetry data.

20 Claims, 9 Drawing Sheets

Request 1: Client Device A to Web Server System X
Request 2: Client Device B to Web Server System Y
Request 3: Client Device A to Web Server System Y

FACILITATING SECURE CLIENT DATA TRANSFER

This application claims the benefit of U.S. Provisional Patent Application Ser. No. 62/915,626 filed Oct. 15, 2019, which is hereby incorporated by reference in its entirety.

FIELD

This technology generally relates to security techniques applicable to client/server systems, and relates, more specifically, to facilitating secure client data transfer.

BACKGROUND

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

Web server systems often manage and store client data. For example, a web server system may maintain data for one or more user accounts. The client data may include personal data that relates to an identifiable individual, private data that a user can reasonably expect to be secured from public view, or other sensitive client data that is protected by one or more agreements, regulations, laws, or other frameworks. These frameworks may also require that the web server system secures the client data from unauthorized access. For example, attackers may use automated software that obtains and/or uses client data, such as to carry out unauthorized acts, crimes, or computer fraud.

An entity that operates a web server system may wish to coordinate with other web server systems to share client data, such as to encourage a user to use its services when interacting with the other web server systems. Such data sharing may generally reduce user friction when the user interacts with the sharing web server system and/or the other web server systems. Unfortunately, such data sharing of user data potentially creates security risks, privacy concerns, and/or legal issues for the sharing web server system. However, without such data sharing there is increased user friction which can lead to reduced use, including a lower completion rate for transactions, such as checkout.

SUMMARY

A method implemented by a security system comprising one or more security server devices, web server systems, or clients includes receiving first telemetry data collected at the client when first instrumentation code provided to the client during a first interaction with a first web server system is executed at the client. The first telemetry data is stored in a telemetry data set comprising telemetry data for one or more interactions between a plurality of clients and a plurality of web server systems. Second telemetry data, collected at the client when the second instrumentation code provided to the client during a second interaction with a second web server systems is executed at the client, is received. Based on the second telemetry data, determining when the telemetry data set includes stored telemetry data for at least one of the one or more interactions between the client and the first web server system. A transfer of data associated with the client and the first web server system that is needed for the second interaction to the second web server system is facilitated when the determination indicates the telemetry data set includes the stored telemetry data.

A security server apparatus, comprising memory comprising programmed instructions stored thereon and one or more processors configured to be capable of executing the stored programmed instructions to receive first telemetry data collected at the client when first instrumentation code provided to the client during a first interaction with a first web server system is executed at the client. The first telemetry data is stored in a telemetry data set comprising telemetry data for one or more interactions between a plurality of clients and a plurality of web server systems. Second telemetry data, collected at the client when the second instrumentation code provided to the client during a second interaction with a second web server systems is executed at the client, is received. Based on the second telemetry data, determining when the telemetry data set includes stored telemetry data for at least one of the one or more interactions between the client and the first web server system. A transfer of data associated with the client and the first web server system that is needed for the second interaction to the second web server system is facilitated when the determination indicates the telemetry data set includes the stored telemetry data.

A non-transitory computer readable medium having stored thereon instructions for facilitating secure client data transfer comprising executable code that, when executed by one or more processors, causes the processors to receive first telemetry data collected at the client when first instrumentation code provided to the client during a first interaction with a first web server system is executed at the client. The first telemetry data is stored in a telemetry data set comprising telemetry data for one or more interactions between a plurality of clients and a plurality of web server systems. Second telemetry data, collected at the client when the second instrumentation code provided to the client during a second interaction with a second web server systems is executed at the client, is received. Based on the second telemetry data, determining when the telemetry data set includes stored telemetry data for at least one of the one or more interactions between the client and the first web server system. A transfer of data associated with the client and the first web server system that is needed for the second interaction to the second web server system is facilitated when the determination indicates the telemetry data set includes the stored telemetry data.

A security system, comprising one or more security server apparatuses, server devices, or clients with memory comprising programmed instructions stored thereon and one or more processors configured to be capable of executing the stored programmed instructions to receive first telemetry data collected at the client when first instrumentation code provided to the client during a first interaction with a first web server system is executed at the client. The first telemetry data is stored in a telemetry data set comprising telemetry data for one or more interactions between a plurality of clients and a plurality of web server systems. Second telemetry data, collected at the client when the second instrumentation code provided to the client during a second interaction with a second web server systems is executed at the client, is received. Based on the second telemetry data, determining when the telemetry data set includes stored telemetry data for at least one of the one or more interactions between the client and the first web server system. A transfer of data associated with the client and the first web server system that is needed for the second interaction to the second web server system is facilitated when the determination indicates the telemetry data set includes the stored telemetry data.

This technology provides a number of advantages including providing security server systems and methods that effectively facilitate secure client data transfer. With examples of this technology, a web content provider may reduce negative impacts caused by increased user friction such as decreased usage and/or incomplete transactions. Additionally, examples of this technology may enable a web content provider to develop mutually beneficial relationships with other web content providers. With examples of this technology, a web content provider may also ensure the transfer data in accordance with privacy rules and regulations. Further, with examples of this technology, the web content provider may better protect its users and itself from fraudsters. Examples of this technology may provide these features relatively simply for the web content providers where these features can be added with minimal modification by the web content provider to hardware or software on its own server systems. Additionally, with examples of this technology security code and/or systems can be provided flexibly by an organization that specializes in web security, which can in turn keep the security code updated to address ever-changing security threats, Such an exemplary security organization with examples of this technology can also aggregate data received across many entities that operate many domains, including telemetry data and/or analyzed telemetry data. Further, such a security organization with examples of this technology can use this aggregated data to generate countermeasures that are more effective than countermeasures that could be developed using only data from a single domain. Additional features and advantages are apparent from the specification and the drawings.

Figure 1:
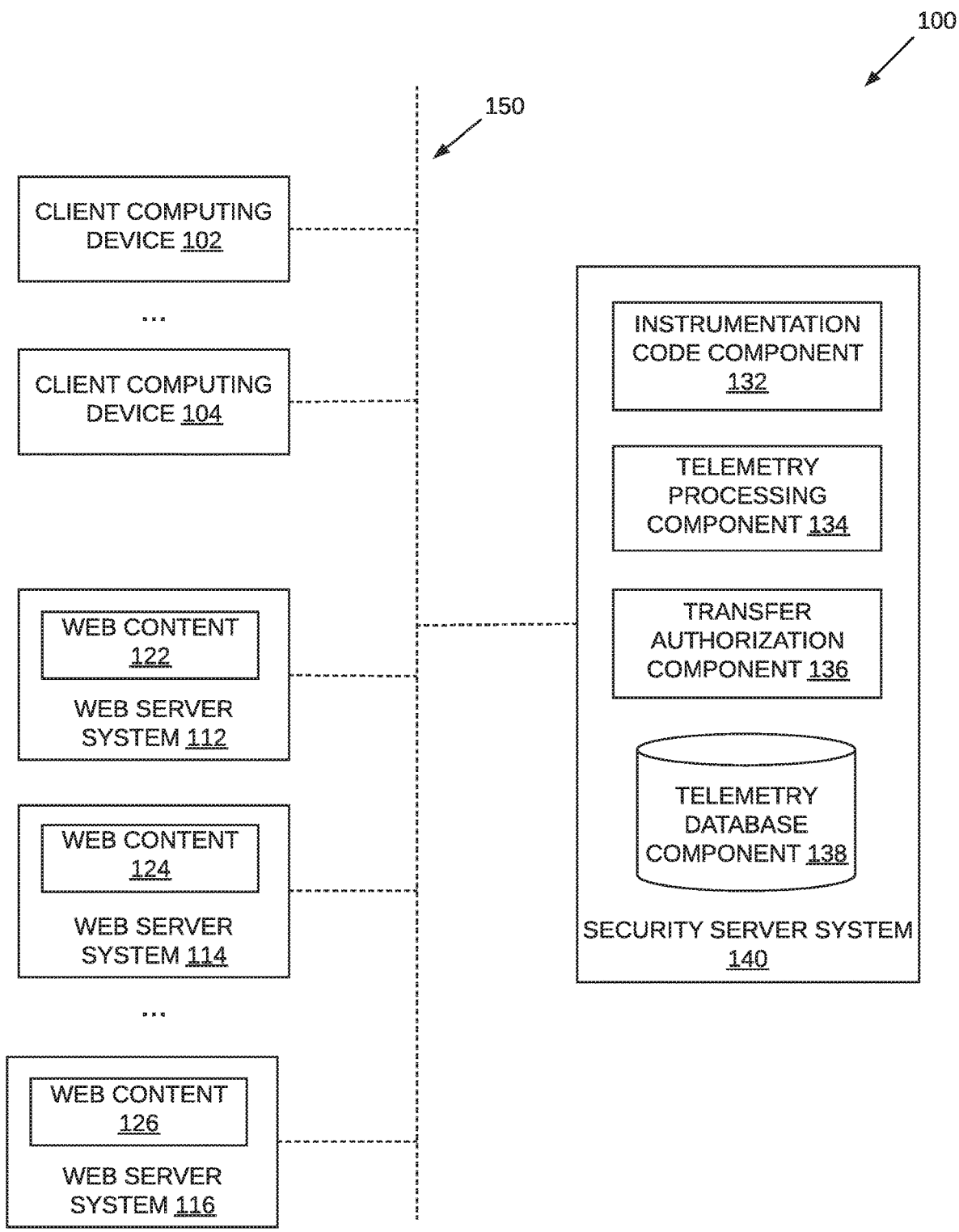
FIG. 1 is a block diagram of an exemplary system or environment with an example of a security server system that facilitates secure client data transfer.

While each of the drawing figures illustrates a particular example for purposes of illustrating a clear example, other examples may omit, add to, reorder, or modify any of the elements shown in the drawing figures. For purposes of illustrating clear examples, one or more figures may be described with reference to one or more other figures, but using the particular arrangement illustrated in the one or more other figures is not required in other examples.

DETAILED DESCRIPTION

In the following description, for the purpose of explanation, numerous specific details are set forth in order to provide a thorough understanding of examples of this technology. It will be apparent, however, that examples of this technology may be practiced without these specific details. In other instances, well-known structures and devices are shown in block diagram form in order to avoid unnecessarily obscuring examples of this technology.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any other characteristic of the referenced items unless otherwise specified; the terms "such as", "e.g.", for example", and the like describe one or more examples, but are not limited to the described example(s); the terms "comprises" and/or "comprising" specify the presence of stated features, but do not preclude the presence or addition of one or more other features.

A "computer system" refers to one or more computers, such as one or more physical computers, virtual computers, and/or computing devices by way of example. As an example, a computer system may be, or may include, one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers.

A "server" (also referred to as "server system" or "server computer system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

1.0 General Overview

This document generally describes systems, methods, devices, and other techniques for example for facilitating secure client data transfer. An entity that operates a web server system may wish to share client data with a second web server system, such as to reduce user friction and/or to increase the likelihood that a user chooses its services when using a second web server system.

An example of a security server system facilitates secure transfer of client data from a first web server system to a second web server system. The security server system may act as a trusted intermediary between the first web server system and the second web server system. The security server system may facilitate secure client data transfer in a manner that protects private and/or sensitive client data from unauthorized access. In some examples, the security server system may ensure compliance with one or more agreements, regulations, laws, or other frameworks when client data is transferred.

In an example, the security server system collects telemetry data for a plurality of interactions, such as requests and/or transactions, between client computing devices and web server systems. For example, to collect the telemetry data, the security server system may provide instrumentation code that collects the telemetry data when the instrumentation code executes at a client computing device. The telemetry data may include data describing properties of a client computing device and/or a user thereof, operations performed at the client computing device, user interaction at the client computing device, or other data collected at the client computing device. In this example, the security server system generates an IDSD from the telemetry data that is usable to identify the client computing device and/or a user of the client computing device.

In some examples, during an interaction between the client computing device and a second web server system, the computer server system collects telemetry data and determines that the IDSD corresponding to the interaction matches IDSD for stored telemetry data associated with an interaction between the client computing device and a first web server system. For example, if prior telemetry data was collected when the client computing device interacted with the first web server system, the prior telemetry data will have the same IDSD. Based on the matching IDSD, the computer server system determines that a user of the client computing device may have an account with the first web server system, and that client data may exist for the user and the first web server system.

In some examples, a computer system provides first instrumentation code for a client computing device during a first interaction between the client computing device and a first web server system. The computer system receives first telemetry data collected at the client computing device when the first instrumentation code is executed at the client computing device. The computer system stores the first telemetry data in a telemetry data set that includes telemetry data corresponding to a plurality of interactions between a plurality of client computing devices and a plurality of web server systems. The computer system provides second instrumentation code for the client computing device during a second interaction between a client computing device and a second web server system. The computer system receives second telemetry data collected at the client computing device when the second instrumentation code is executed at the client computing device. Based on the second telemetry data, the computer system determines that the telemetry data set includes telemetry data for one or more interactions between the client computing device and the first web server system. The computer system facilitates a transfer, to the second web server system, of data associated with the client computing device and the first web server system that is needed for the second interaction between the client computing device and the second web server system.

The various examples of techniques described herein may achieve one or more of the following advantages: a web content provider may reduce user friction for legitimate users; in particular, the web content provider may reduce negative impacts caused by increased user friction, such as decreased usage and/or incomplete transactions; the web content provider may develop mutually beneficial relationships with other web content providers; the web content provider may ensure the transfer data in accordance with privacy rules and regulations; the web content provider may better protect its users and itself from fraudsters; such features may be provided relatively simply for the web content providers in certain implementations; in particular implementations, such features can be added with minimal modification by the web content provider to hardware or software on its own server systems; security code and/or systems can be provided flexibly by an organization that specializes in web security, which can in turn keep the security code updated to address ever-changing security threats; such a security organization can also aggregate data received across many entities that operate many domains, including telemetry data and/or analyzed telemetry data; such a security organization can use such aggregated data to generate countermeasures that are more effective than countermeasures that could be developed using only data from a single domain. Additional features and advantages are apparent from the specification and the drawings.

2.0 System Overview

Referring to FIG. 1, an example of computer system 100 that includes a security server system 140 is illustrated. In this example, the computer system 100 includes a plurality of web server systems 112-116, a plurality of client computing devices 102-104, and a security server system 140, although the system may have other numbers and/or types of systems, devices, or other elements. The client computing devices 102-104, web server systems 112-116 and security server system 140 communicate over one or more networks 150. The one or more networks 150 may include one or more local area networks (LANs) and/or one or more wide area networks, such as the Internet by way of example only. The network arrangement and connectivity between the client computing devices 102-104, the web server systems 112-116 and the security server system 140 may vary.

The web server systems 112-116 may host web content 122-126, making the web content 122-126 available to one or more of the client computing devices 102-104. For example, the web content 122-126 may include one or more web pages, images, audio, video, messages, files, data, scripts, services, application content, and other content available over the one or more networks 150. In some examples, the web content 122-126 includes any data, instructions, or other content provided by the web server systems 112-116 over the Internet, such as one or more responses to requests from the client computing devices 102-104 by way of example.

The exemplary security server system 140 facilitates secure sharing of client data from, for example, a particular web server system 112 to one or more other web server systems, such as web server system 116. One of the web server systems 112-116 that shares client data to one or more other web server systems 112-116 is also referred to herein as a sharing web server system. Another one of the web server systems 112-116 that receives shared client data is referred to herein as a receiving web server system. In some examples, a sharing one of the web server systems 112-116 and a receiving one of the web server systems 112-116 may have a sharing agreement. The sharing agreement may specify that the security server system 140 is authorized to initiate and otherwise facilitate secure client data transfer from the sharing one of the web server systems 112-116 to the receiving one of the web server systems 112-116.

Each of the web server systems 112-116 may act as a sharing web server system, a receiving web server system, or both. A sharing agreement may be one-way or two-way, may involve one or multiple sharing web server systems, and may involve one or multiple receiving web server systems. A particular web server system may be involve in one or multiple sharing agreements.

2.1 Client Data

In this example, client data refers to any data stored or otherwise maintained by a web server system 112-116 about one or more client computing devices 102-104 and/or one or more users, although the client data may comprise other information as well. The one or more users may be associated in this example with one or more of the client computing devices 102-104. Client data may include one or more of preferences, behavior, history, settings, and/or other data relating to a user and/or one of the client computing devices 102-104. The plurality of client computing devices 102-104 may be operated by users of a website, application, or other service provided by the plurality of web server systems 112-124. A particular user may be a user of a single web server system or multiple web server systems of the plurality of web server systems 112-116.

In some examples, client data includes personal data that relates to an identifiable individual. Client data may, for example, include private data concerning an account or an individual associated with the account that the individual can reasonably expect to be secured from public view. For example, user authentication may be required to access private data stored by a particular web server system 112 in order to prevent unauthorized users from accessing the private data. As used herein, the term "account" refers to any relationship between a user and one of the web server systems 112-116 for which authentication of the user is required.

Client data may include sensitive client data that is protected by one or more agreements, regulations, laws, or other frameworks. The security server system 140 may ensure satisfaction of the one or more requirements of such agreements, regulations, laws, and/or other frameworks when facilitating secure client data transfer. For example, the security server system 140 may coordinate secure client data transfer between a sharing web server system and a receiving web server system in a manner that reduces user friction while complying with one or more consent requirements for sharing any sensitive client data.

2.2 Security Server System

In this example, the security server system 140 facilitates secure client data transfer between the web server systems 112-116. In some examples, the security server system 140 includes an instrumentation code component 132, a telemetry processing component 134, a transfer authorization component 136, and a telemetry database component 138 as illustrated and described by way of the examples herein, although the security server system 140 may have other types and/or numbers of components.

The security server system 140 and/or its components (e.g. instrumentation code component 132, telemetry processing component 134, transfer authorization component 136, and/or telemetry database component 138) as described herein are presented as individual components for ease of explanation. Any action performed by or to one or more components of the security server system 140 may be considered performed by or to the security server system 140. The security server system 140 and/or its components may be implemented as one or more dependent or independent processes, and may be implemented on one or multiple computers. For example, a component may be implemented as a distributed system or alternatively and/or in addition, multiple instances of one or more components may be implemented. Furthermore, a component shown may be implemented fully and/or partially in one or multiple programs and/or processes, and two or more components shown may be implemented fully and/or partially in the same program and/or process.

2.3 Instrumentation Code

In this example, the instrumentation code component 132 provides instrumentation code to collect telemetry data about particular signals at the client computing devices 102-104. As used herein, the term "instrumentation code" refers to source code, bytecode, or binary software that is executed on a computer to collect data at the computer. In this example, instrumentation code may be JavaScript that collects and/or otherwise generates data on one of the client computing devices 102-104 and sends that data, referred to as telemetry data, to one of the web server systems 112-116. In some examples, the instrumentation code includes instructions to send collected telemetry data to one of the web server systems 112-116 over one or more requests or transactions. For example, the security server system 140 may receive the telemetry data directly from one of the client computing devices 102-104 or indirectly via one or more other computers.

In some examples, the instrumentation code component 132 provides instrumentation code to one of the client computing devices 102-104 when the one of the client computing devices 102-104 interacts with one of the web server systems 112-116. For example, the instrumentation code component 132 may provide instrumentation code for execution at one of the client computing devices 102-104 when the one of the client computing devices 102-104 requests one of the web contents 122-126 from one of the web server systems 112-116. In some examples, the interaction may include a user interacting with an application on one of the client computing devices 112-116, such as a web application or a native application installed on a computer or a mobile device.

In some examples, the security server system 140 provides instrumentation code to collect telemetry data during one or more particular interaction types. For example, the instrumentation code component 132 may provide instrumentation code to one of the client computing devices 102-104 when the one of the client computing devices 102-104 requests to log in to one of the web server systems 112-116. The instrumentation code component 132 may provide instrumentation code for one or more specific transaction types, such as login transactions, other authentication transactions, purchase transactions, financial transactions, data submission, account creation, and/or other transaction types. An interaction for which the security server system 140 collects telemetry data using instrumentation code is also referred to herein as a monitored interaction.

In some examples, the instrumentation code component 132 provides different instrumentation code in different situations. For example, the instrumentation code component 132 may provide different instrumentation code to clients of different ones of the web server systems 112-116. In some examples, the instrumentation code component 132 provides different instrumentation code for different client computing devices 102-104. For example, different instrumentation code may be provided when one or more of the client computing devices 102-104 are running different browsers, operating systems, or other software (including different versions thereof), or when the security server system 140 determines that one or more of the client computing devices 102-104 pose a different amount or type of security risk.

The instrumentation code may be provided in different formats. For example, the instrumentation code may include JavaScript code, and/or other web code that executes in a browser or other JavaScript engine at one of the client computing devices 102-104. In some examples, the instrumentation code may include bytecode, such as JavaScript bytecode. The instrumentation code may be provided with web code requested by one of the client computing devices 102-104. In some examples, the instrumentation code may be obfuscated to prevent an attacker from understanding the instrumentation code, and/or integrated with the web code to prevent execution of the web code without execution of the instrumentation code.

In some examples, at least a portion of the instrumentation code is provided in an application installed at one or more of the client computing devices 102-104 by providing a Software Development Kit (SDK) to a developer of the application. When the application at one of the client computing devices 102-104 interacts with the application server of one of the web server systems 112-116, the application may interact with the instrumentation code component 132, such as by sending telemetry data and/or obtaining additional instrumentation code for execution at the requesting one of the client computing devices 102-104.

2.4 Telemetry Data

The telemetry processing component 134 receives and processes telemetry data collected at one or more of the client computing devices 102-104. In some examples, the telemetry processing component 134 maintains a telemetry data set that includes telemetry data collected for a plurality of interactions between client computing devices 102-104 and web server systems 112-116. For example, the telemetry processing component 134 may store the telemetry data set in a telemetry database component 138 that is accessible to other components of the security server system 140 to facilitate secure client data transfer.

The instrumentation code may collect telemetry data about particular signals at one or more client computing devices 102-104. As used herein, the term "signal" refers to a specific type of data to collect at one or more of the client computing devices 102-104, such as a particular property and/or aspect of: a computing environment at one or more of the client computing devices 102-104; one or more operating states at one or more of the client computing s 102-104; one or more operations performed at one or more of the client computing devices 102-104; user interaction at one or more of the client computing devices 102-104; and/or other properties and/or aspects at one or more of the client computing devices 102-104. As used herein, the term "signal value" refers to a value for a signal (e.g. the specific type of data) at one or more of the client computing devices 102-104, as detected by the instrumentation code. For example, a signal may be an IP address, while a signal value collected at one of the client computing device 102-104 is the IP address of the one of the client computing devices 102-104 (e.g. 123.456.78.9). Other signals may include network properties, operating system properties, browser properties, installed software properties, display size, other hardware properties, device configuration properties, information about execution of web code or other web content, information about processing of web content, information about human or software interactions with the web content, information about user inputs at the one of the client computing devices 102-104; and other signals that are collectable when the instrumentation code is executed at the one of the client computing devices 102-104. In some examples, a different number of signals may be collected for different transactions.

2.4.1 Identifying Signal Data (IDSD)

Figure 2A:
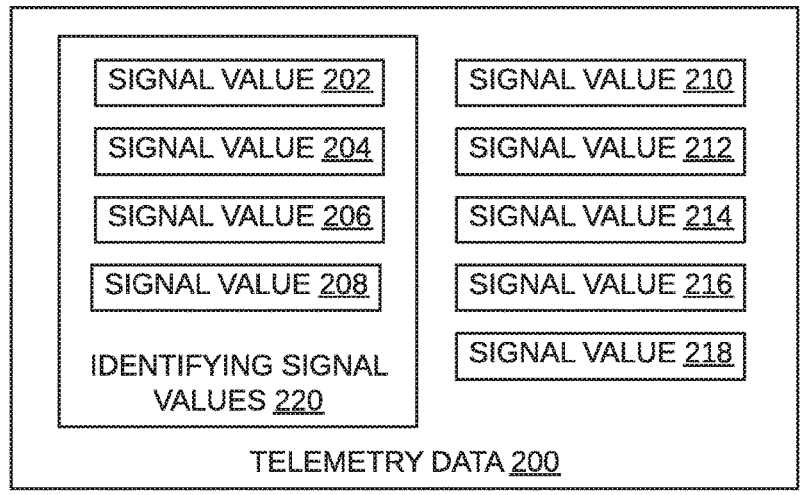
FIG. 2A is a diagram of exemplary telemetry data and identifying signal data (IDSD) for a set of transactions.

Identifying signal data (IDSD) can be generated or otherwise determined for each interaction based on the telemetry data received from one of the client computing devices 102-104 involved in the interaction. An example of telemetry data and IDSD for a set of transactions is illustrated in FIG. 2A. In this example, the telemetry data 200 is generated at a client computing device (e.g. one of the client computing devices 102-104) when instrumentation code provided by a security server system (e.g. security server system 140) is executed at the client computing device (e.g. the requesting one of the client computing devices 102-104).

In this example, the telemetry data 200 includes a plurality of signal values 202-218. Instrumentation code executing at one of the client computing devices 102-104 can collect signal values 202-218 for a set of specified signals. For example, the instrumentation code may collect a display size signal of the corresponding one of the client computing devices 102-104, and the reported signal value 202 for the display size signal may indicate dimensions of a display of the corresponding one of the client computing devices 102-104, such as 1440×2560 pixels.

In this example the telemetry data 200 includes identifying signal values 220 for a set of one or more identifying signals. The identifying signals are selected such that the identifying signal values 220 are expected to uniquely identify the one of the client computing devices 102-104 and/or a particular user on one of the client computing devices 102-104 corresponding to the telemetry data 200. The identifying signal values 220 may include at least a subset of the signal values 202-218 in the telemetry data

200. In this example, the identifying signal values 220 include four signal values 202-208. The telemetry data 200 may include other signal values 210-218 that are not included in the identifying signal values 220. In some examples, the telemetry data 200 may include only the identifying signal values 220.

In this example, the security server system 140 generates an identifying signal data (IDSD) corresponding to the interaction based on the corresponding telemetry data. The IDSD may include one or more identifying signal values 220, one or more derived values that generated based on one or more identifying signal values 220, or a combination thereof. In some examples, the IDSD is the unprocessed identifying signal values 220 for the set of identifying signals. Alternatively and/or in addition, the IDSD may be determined by processing one or more of the identifying signal values 220. For example, a deterministic function, such as a hash or another function, may be applied by the security server system 140 to the identifying signal values 220 to generate the IDSD. In some examples, a telemetry database component (e.g. telemetry database component 138) stores processed IDSDs in the telemetry data set in association with the telemetry data.

In this example, The security server system 140 may facilitate secure client data transfer using a set of identifying signals that is selected to distinguish different ones of the client computing devices 102-104 with a high probability. That is, in some cases, different ones of the client computing devices 102-104 may generate telemetry data with the same IDSD. The identifying signals may also be selected so that the IDSD distinguishes a characteristic other than the one of the client computing devices 102-104 associated with the telemetry data. For example, the identifying signals may be selected to generate an IDSD that distinguishes a particular individual or user on one of the client computing devices 102-104.

In some examples, the identifying signal values 220 are collected for identifying signals that are expected to be static and/or infrequently changing on the client computing devices 102-104, such as a display size, an operating system type, and/or another static or infrequently changing signal. When an infrequently changing signal is used, a transaction by the same one of the client computing devices 102-104 may have telemetry data that generates a different IDSD than a prior transaction. However, the change in IDSD is expected to happen infrequently, and the one of the client computing devices 102-104 will develop a newer transaction history with the newer IDSD.

2.4.2 Matching Telemetry Data

A security server system (e.g. security server system 140) may use an IDSD for an interaction between a particular client computing device (e.g. one of the client computing devices 102-104) and a web server system (e.g. one of the web server systems 112-116) to identify matching telemetry data in a stored telemetry data set. Matching telemetry data has an IDSD that matches the IDSD corresponding to the particular one of the client computing devices 102-104. The matching telemetry data corresponds to one or more interactions that likely involving the particular one of the client computing devices 102-104 and/or a user of the particular one of the client computing devices 102-104.

A security server system (e.g. security server system 140) may use an IDSD generated based on telemetry data collected during an interaction between a client computing device (e.g. one of the client computing devices 102-104) and a receiving web server system (e.g. one of the web server systems 112-116) to identify matching telemetry data for one or more associated interactions involving the same client computing device (e.g. the same one of the client computing devices 102-104) and a particular sharing web server system (e.g. another one of the web server systems 112-116). In some examples, based on identifying the matching telemetry data, the security server system 140 determines that a user of one of the client computing devices 102-104 likely has an account with the sharing web server system (e.g. another one of the web server systems 112-116). For example, when telemetry data is collected for login operations to the receiving web server system (e.g. the one of the web server systems 112-116), the existence of matching telemetry data indicates the existence of an account with the sharing web server system (e.g. the one of the web server systems 112-116) that is associated with a client computing device (e.g. the requesting one of the client computing devices 102-104) with the same IDSD. In some examples, the telemetry database component 138 stores additional interaction data for telemetry data associated with a transaction or other interaction, such as the type of transaction (e.g. a login request) and whether the operation succeeded or failed (e.g. successful login or failed login) and/or may have one or other rules or other regulations regarding what data may be shared and how.

Figure 2B:
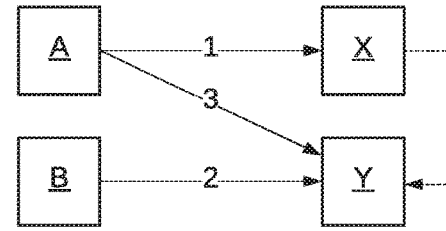
FIG. 2B is a diagram on an example of requests between client devices and web server systems and a resulting stored telemetry data set.

Referring to FIG. 2B, an example of requests between two of the client devices 102-104 (illustrated as Client Devices A and B) and two of the web server systems 112-116 (illustrated as Web Server Systems X and Y) and a stored telemetry data set is illustrated. In this example, the telemetry data set 250 includes telemetry data 252-256 corresponding to three requests: Request 1 is from Client Device A to Web Server System X during a first transaction; Request 2 is from Client Device B to Web Server System Y during a second transaction; and Request 3 is from Client Device A to Web Server System Y during a third transaction. Additionally, in this example: Client A submitted telemetry data 252 in association with Request 1; Client B submitted telemetry data 254 in association with Request 2; and Client A submitted telemetry data 256 in association with Request 3.

In this example shown in FIG. 2B, the telemetry data 252-256 for the transactions each include signal values for nine signals, of which four signals are identifying signals, although other types and/or numbers may be included. Each of telemetry data 252-256 also includes identifying signal values 258-262 for the four identifying signals. In this example, the identifying signal values 258 and identifying signal values 262 are the same because telemetry data 252 and telemetry data 256 were both generated at Client Device A. The identifying signal values 260 generated at Client Device B differ from the identifying signal values 258 and 262 generated at Client Device A.

In this example, a security server system (e.g. security server system 140) generates IDSD 1 for Request 1 based on identifying signal values 258. The security server system 140 generates IDSD 2 for Request 2 based on identifying signal values 260. The security server system 140 generates IDSD 3 for Request 3 based on identifying signal values 262. IDSD 1 and IDSD 3 match because they are generated based on the same underlying identifying signal values 258 and 262.

In some examples, the security server system 140 uses the IDSD to determine when a client computing device (e.g. one of the client computing devices 102-104) interacting with a receiving web server system (e.g. one of the web server systems 112-116) has an account at a particular sharing web server system (e.g. one of the web server systems 112-116) that has a sharing agreement with the receiving web server system. For example, when Request 3 from Client Device A to Web Server System Y is processed, the security sever system 140 may determine that Client Device A likely has an account with Web Server System X based on one or more prior requests to Web Server System X associated with an IDSD that matches IDSD 3 (e.g. IDSD 1 for Request 1 from Client Device A to Web Server System Y).

2.5 Match Score

A security server system (e.g. security server system 140) may identify a plurality of transactions with matching IDSD involving a particular client computing device (e.g. one of the client computing devices 102-104) to determine whether to initiate secure client data transfer between two web server systems (e.g. two of the web server systems 112-116). In some examples, the security server system 140 generates a match score based on the matching telemetry data collected for the one or more associated transactions.

In some examples, the match score is generated based on an outcome, success status, or other metadata for one or more transactions with a matching IDSD between the corresponding client computing device and a sharing web server system. For example, the match score may increase when many successful interactions with the sharing one of the web server systems 112-116 are found with a matching IDSD, indicating both the existence of an account associated with the IDSD at the sharing one of the web server systems 112-116 and a reliable transaction history between the one of the client computing devices 102-104 (and/or an associated user) and the sharing one of the web server systems 112-116. The metadata may be stored with the corresponding telemetry data and/or IDSD in a stored telemetry data set. For example, if the one of the client computing devices 102-104 is involved with many unsuccessful login operations with multiple ones of the web server systems 112-116, the security server system 140 may determine not to initiate secure client data transfer between the receiving one of the web server systems 112-116 and the sharing one of the web server systems 112-116.

In some examples, the match score is based on a number of valid transactions of the one or more associated transactions that were not associated with any attack, such as a large quantity of attempted login operations by a malicious user. The match score may also be based on a timing of the valid transactions. For example, telemetry data corresponding to more recent valid transactions may be given more weight than telemetry data corresponding to less recent valid transactions.

3.0 Example System Architecture

A security server system (e.g. security server system 140) may include one or more server systems that provide instrumentation code to client computing devices (e.g. client computing devices 102-104) and process telemetry data received from the client computing devices when the instrumentation code executes on the client computing devices.

Figure 2B:
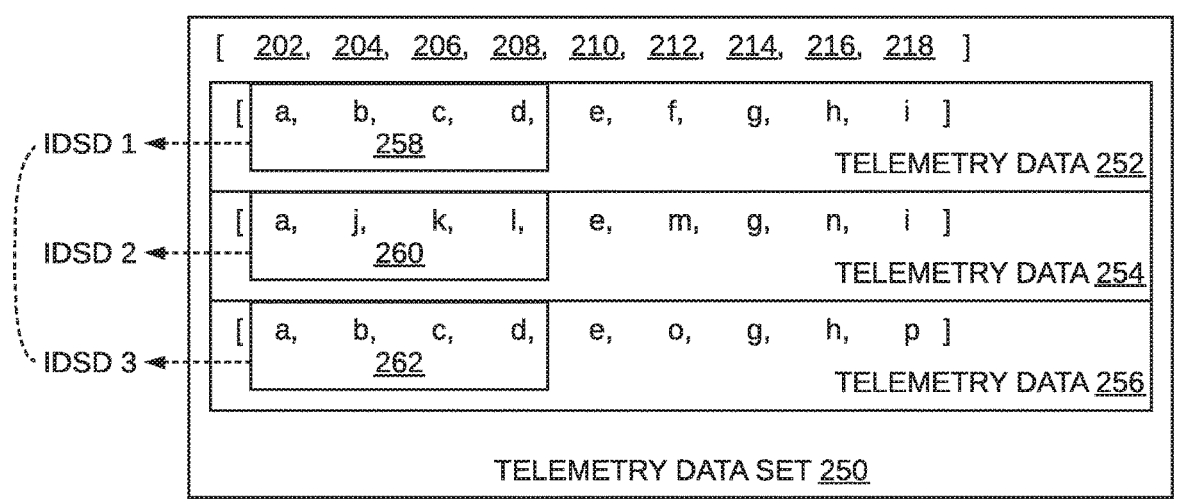
Figure 3:
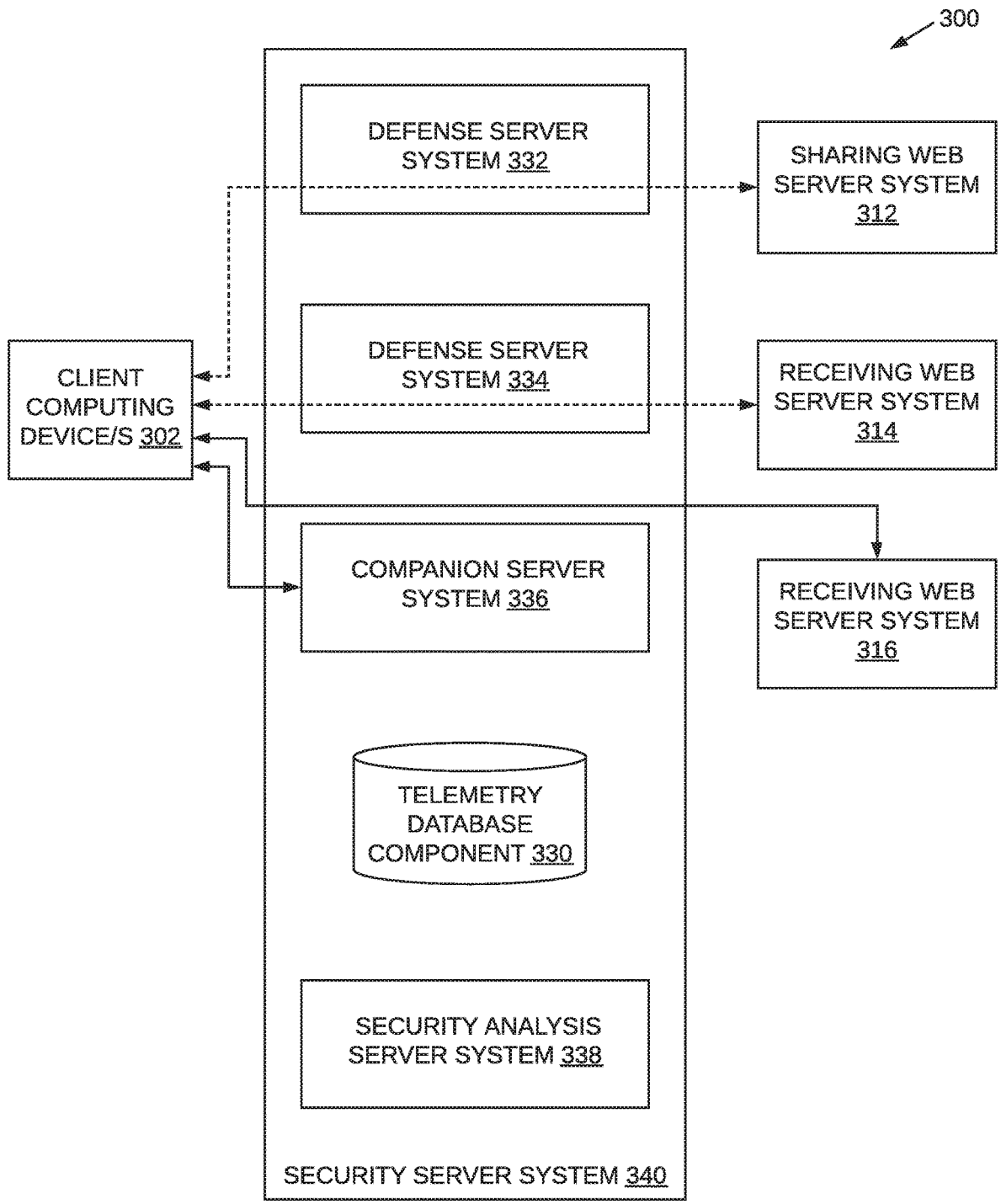
FIG. 3 is a block diagram of another exemplary system or environment with an example of another security server system that facilitates secure client data transfer.

Referring to FIG. 3, another exemplary system or environment with an example of another security server system that facilitates secure client data transfer is illustrated. In this example, the one or more client computing devices 302 (for ease of illustration shown as one block) in FIG. 3 is/are the same in structure and operation as the client computing devices 102-104 illustrated and described in the examples in FIGS. 1-2B, except as otherwise illustrated and described by way of the examples herein. Additionally, the security server system 340 in FIG. 3 is the same in structure and operation as the security server system 140 illustrated and described in the examples in FIGS. 1-2B, except as otherwise illustrated and described by way of the examples herein. Further, the web server systems 312-316 in FIG. 3 are the same in structure and operation as the web server systems 112-116 as illustrated and described in the examples in FIGS. 1-2b, except as otherwise illustrated and described by way of the examples herein.

In this example, the computer system 300 includes a security server system 340 that facilitates secure client data transfer from a sharing web server system 312 to one or more receiving web server systems 314-316. One or more client computing devices 302 interact with web content hosted by the web server systems 312-316. A security server system 340 may include one or more sharing web server systems 312 and one or more receiving web server systems 314-316. The same one of the web server systems 312-316 may be a sharing web server system in some contexts, such as by sharing client data with a set of one or more web server systems, and a receiving web server system in other contexts, such as by receiving client data from another one of the web server systems 312-316.

3.1 Defense Server System

The security server system 340 may include one or more defense server systems 332-334. A defense server system 332-334 is associated with one or more web server systems 312-314. The defense server system 332-334 performs actions relating to transactions and/or other interactions between one or more of the client computing devices 302 and the associated one of the web server systems 312-316. A defense server system 332 that is associated with a particular one of the web server systems 312-316 performs one or more actions during interactions between client computing devices 302 and the particular web server system 312.

A defense server system 332-334 may provide instrumentation code for execution at a client computing device 302. In some examples, a defense server system 332-334 adds instrumentation code to, or otherwise integrates instrumentation code with web content served by the associated web server system 312-314 that can initiate a monitored interaction. For example, when a login request to a web server system 312-314 is a monitored interaction, the defense server system 332-334 may provide instrumentation code to web content from the web server system 312-314 that includes a login interface that a user can use to initiate a login request from the client computing device 302. The instrumentation code executes with the web content when the web content executes on the client computing device 302 that requested the web content. In some examples, when the monitored interaction is initiated at the client computing device 302, the telemetry data is transmitted to the defense server system 332-334. For example, the telemetry data may be included with a request from the client computing device 302 that initiates the monitored interaction.

When client computing device 302 interact with a sharing web server system 312 associated with a defense server system 332, the defense server system 332 provides instrumentation code to the client computing device 302 and processes telemetry data collected at the client computing device 302 when the corresponding instrumentation code executes at the client computing device 302. The defense server system 332 may store telemetry data and/or IDSD corresponding to the interactions with the sharing web server system 312 in a telemetry database component 330 of the security server system 340. The data stored in the telemetry database component 330 will be available across the security server system 340 to facilitate secure data transfer between the sharing web server system 312 and receiving web server systems 314-316.

When client computing device 302 interact with a receiving web server system 314 associated with a defense server system 334, the defense server system 334 provides instrumentation code to the client computing device 302 and processes telemetry data collected at the client computing device 302 when the corresponding instrumentation code executes at the client computing device 302. The defense server system 334 may store telemetry data and/or IDSD corresponding to the interactions with the receiving web server system 314 in the telemetry database component 330.

The defense server system 334 may identify an opportunity for secure client data transfer from a sharing web server system 312 to the receiving web server system 314 based on based on the IDSD for a particular interaction and telemetry data corresponding to other interactions in the telemetry database component 330. For example, the defense server system 334 may determine that a user or client computing device 302 involved in the particular interaction with the receiving web server system 314 has an account with the sharing web server system 312.

A defense server system 332-334 may be positioned in different network configurations with respect to the client computing device 302 and an associated web server system 312-314. For example a defense server system 332-334 may be deployed in an in-line configuration, an out-of-band configuration, or another configuration that allows the defense server system 332-334 to perform actions relating to transactions and/or other interactions as they occur between client computing device 302 and one or more web server systems 312-314.

In an in-line configuration, a defense server system 332-334 may as a reverse proxy server to an associated web server system 312-314 by intercepting one or more communications between the client computing device 302 and the associated web server system 312-314. As a reverse proxy server, the defense server system 332-334 retrieves resources, such as web content, on behalf of clients of the associated web server systems 312-314. To the client computing device 302, the resources appears to originate from the associated web server system 312-314. The defense server system 332-334 may be deployed locally to the web server system 312-314 or deployed over the Internet with respect to the web server system 312-314, such as in a cloud computing system managed by a security company, and/or in a computer system operated by a security company. For example, the defense server system 332-334 may intercept messages to the client computing device 302 and add instrumentation code for execution at the client computing device 302. As another example, the defense server system 332-334 may intercept requests to the associated web server system 312-314 that include collected telemetry data from the client computing device 302, process the telemetry data, and forward the requests to the associated web server system 312-314.

In an out-of-band configuration, a defense server system 332-334 may be involved in transactions and/or other interactions without intercepting communications between the client computing device 302 and the associated web server system 312-314. For example, a web server system 312-314 may obtain instrumentation code from the corresponding defense server system 332-334, provide the instrumentation code to the client computing device 302, receive telemetry data generated at the client computing device 302, and/or provide the corresponding defense server system 332-334 the telemetry data received from the client computing device 302.

3.1.1 Implementing Security Countermeasures

In some examples, the security server system 340 is operated by a security company or another entity that provides web security services. One or more web server systems 312-314 may be operated by security service customers, or entities that are provided security services by the security company. The security server system 340 protects the web server systems 312-314 of security service customers from attacks, such as attacks by malicious automated software executing on one or more client computing devices 302.

In some examples, the defense server systems 332-334 may analyze transactions and/or other interactions between the one or more client computing devices 302 and the associated web server systems 312-314 to detect and mitigate attacks on the associated web server systems 312-314. For example, one or more of the defense server systems 332-334 may collect and evaluate telemetry data corresponding to a transaction to determine whether the transaction is involved in an attack, such as whether the one of the one or more client computing devices 302 involved in the transaction is controlled by automated malicious software. The one or more defense server systems 332-334 may analyze telemetry data for an interaction to prevent an attack in real time, such as by such as blocking, redirecting, or flagging communications that correspond to the interaction.

When analyzing telemetry data to provide security services, the defense server systems 332-334 may store the telemetry data in the telemetry database component 330. Telemetry data stored in the telemetry database component 330, including any telemetry data collected to implement security services, is available for facilitating secure client data transfer as described herein. In some examples, a subset of the signals collected to provide security services is used as identifying signals to facilitate secure client data transfer. In some examples, telemetry data stored in the telemetry database component 330, including any telemetry data collected to facilitate secure client data transfer, is available for security analysis, such as by the security analysis server system 338.

The security server system 340 may include a security analysis server system 338 that evaluates telemetry data collected at the one or more client computing devices 302 to detect signatures or other properties of transactions initiated by malicious software executing on the one or more client computing devices 302. The security analysis server system 338 may use the telemetry data set to learn about new attacks and/or to deploy new countermeasures for real-time attack detection and prevention. For example, the security analysis server system 338 may update the defense server systems 332-334 with the new countermeasures so that the defense server systems 332-334 may use the new security countermeasures to process transactions between associated web server systems 312-314 and the one or more client computing devices 302 in real time.

In some examples, the security server system 340 stores an outcome, success status, or other metadata for one or more transactions in the telemetry database component 330. The security server system 340 may use the matching telemetry data and/or other data stored for the associated transactions to determine whether the other transactions were involved in an attack. In some examples, the security server system 340 uses an outcome, success status, or other metadata regarding a transaction to determine whether to initiate secure client data transfer.

3.2 Companion Server System

The security server system 340 may include one or more companion server systems 336 associated with one or more web server systems 312-316. A companion server system 336 that is associated with a particular one of the web server systems 312-316 may perform one or more actions during interactions between one or more client computing devices 302 and the one or more web server systems 312-316.

Each of the one or more companion server systems 336 may provide instrumentation code for execution at one or more of the client computing devices 302. Each of the one or more companion server systems 336 may also receive and/or analyze telemetry data for one or more interactions between the one or more client computing devices 302 and the associated one or more of the web server systems 312-316. When one of the client computing devices 302 interacts with a receiving one of the web server systems 314-316 associated with a companion server system 336, the associated companion server system 336 provides instrumentation code to the requesting one of the client computing devices 302 and processes telemetry data collected at the requesting one of the client computing devices 302 when the corresponding instrumentation code executes at the requesting one of the client computing devices 302. The companion server system 336 may store telemetry data and/or IDSD corresponding to the interactions with the one of the receiving web server systems 314-316 in the telemetry database component 330.

In some examples, compared to one of the defense server systems 332-334, the companion server system 336 facilitates secure data transfer with a lower degree of integration between the associated one of the web server systems 312-316 and the companion server system 336. For example, the instrumentation code provided by the companion server system 336 may be provided to the requesting one of the client computing devices 302 separately from the web code served by the associated one of the web server systems 312-316. In some examples, the companion server system 336 does not modify web content served by the associated one of the web server systems 312-316. The associated one of the web server systems 312-316 may make a minor modification to its web content by adding a small amount of code to redirect the requesting one of the client computing devices 302 to the companion server system 336.

In some examples, one of the web server systems 312-316 associated with the companion server system 336 may be operated by an entity that is not a security service customer. An entity that is not a security service customer may not require or desire the same degree of transaction monitoring or evaluation. In some examples, the set of telemetry data collected by the companion server system 336 may include less signal values than telemetry data collected by the defense server systems 332-334 that provides security services.

The companion server system 336 may identify an opportunity for secure client data transfer from a sharing web server system 312 to one of the receiving ones of the web server system 314-316 in this example based on the IDSD for a particular interaction and telemetry data corresponding to other interactions in the telemetry database component 330. For example, the companion server system 336 may determine that a user or one of the client computing devices 302 involved in the particular interaction with one of the receiving web server systems 314-316 has an account with the sharing web server system 312.

4.0 Secure Client Data Transfer

The security server system 340 may facilitate secure client data transfer using one or more techniques. In this example, the security server system 340 may facilitate secure client data transfer between a particular sharing web server system 312 and different one of the receiving web server systems 314-316 using the same set of one or more techniques or different set of one or more techniques. The security server system 340 may facilitate secure client data transfer between a sharing web server system 312 and one of the receiving web server systems 314-316 for different ones of the client computing devices 302 using the same technique or different techniques. Example techniques for facilitating secure client data transfer are described hereinafter.

4.1 Obtaining Authorization for Secure Data Transfer

After identifying an opportunity for secure client data transfer from a sharing web server system 312 to one of the receiving web server systems 314-316, the security server system 340 may obtain consent and/or authorization from a user of one of the client computing devices 302 before sharing client data associated with the user.

In some examples, the security server system 340 requires additional authentication from the one of the client computing devices 302 for the account at the sharing web server system 312 before initiating secure client data transfer. For a particular sharing agreement involving the sharing web server system 312, the security server system 340 may always require additional authentication, or may make a determination on whether to require additional authentication for a particular interaction. For example, the security server system 340 may consider additional factors, such as the sensitivity of the client data, an amount of client data, the match score or other analysis of the matching telemetry data, other metadata associated with the matching telemetry data, and/or other factors. Alternatively and/or in addition, the security server system 340 may consider a security risk associated with the one or more client computing devices 302.

In some examples, after matching the IDSD, the security server system 340 obtains authorization from the one of the client computing devices 302 before transferring client data from the sharing web server system 312. For example, during an interaction between the one of the client computing devices 302 and a receiving one of the web server system 314-316, the security server system 340 may ask a user at the one of the client computing devices 302 to authorize the transfer of the user's client data associated the sharing web server system 312. In some examples, the client data is presented to the user at the one of the client computing devices 302 during an interaction between the one of the client computing devices 302 and one of the receiving web server systems 314-316. The user may have control over whether to submit the client data to the one of the receiving web server systems 314-316. Alternatively and/or in addition, the security server system 340 may present an interface to the user at the one of the client computing devices 302 that requests consent and/or authorization to share the client data to the receiving one of the web server systems 314-316. The interface may either display the client data to be shared or describe the type of client data to be shared.

4.2 Iframe Privacy Implementation

In some examples, a security server system 340 facilitates secure client data transfer to one of the receiving web server systems 314-316 using an inline frame element within web content hosted by the one of the receiving web server systems 314-316. For example, the <iframe> HTML tag defines a rectangular region within an HTML document in which a separate HTML document is displayed. An inline frame element is usable to embed web content from the security server system 340 in the web content from the one of the receiving web server systems 314-316. The embedded web content may or may not be visible to a user of the requesting one of the client computing devices 302 when the web content from the one of the receiving web server systems 314-316 is rendered.

In some examples, the inline frame element is used to provide privacy. When an inline frame element from a different domain (e.g. the security server system 340) is loaded within web content from one of the receiving web server systems 314-316, the two domains cannot access the other page without traditional commands for communication between two domains (e.g. POST, GET). The inline frame element may be used to prevent the one of the receiving web server systems 314-316 from seeing any client data before a user of one of the client computing devices 302 consents to sharing client data. For example, when the existence of the account at the sharing web server system 312 is considered private, the security server system 340 may use the inline frame element to collect telemetry data, authenticate a user and/or obtain authorization to share client data from the sharing web server system 312 without revealing the fact that a user of one of the client computing devices 302 likely has an account with the sharing web server system 312.

Figure 4:
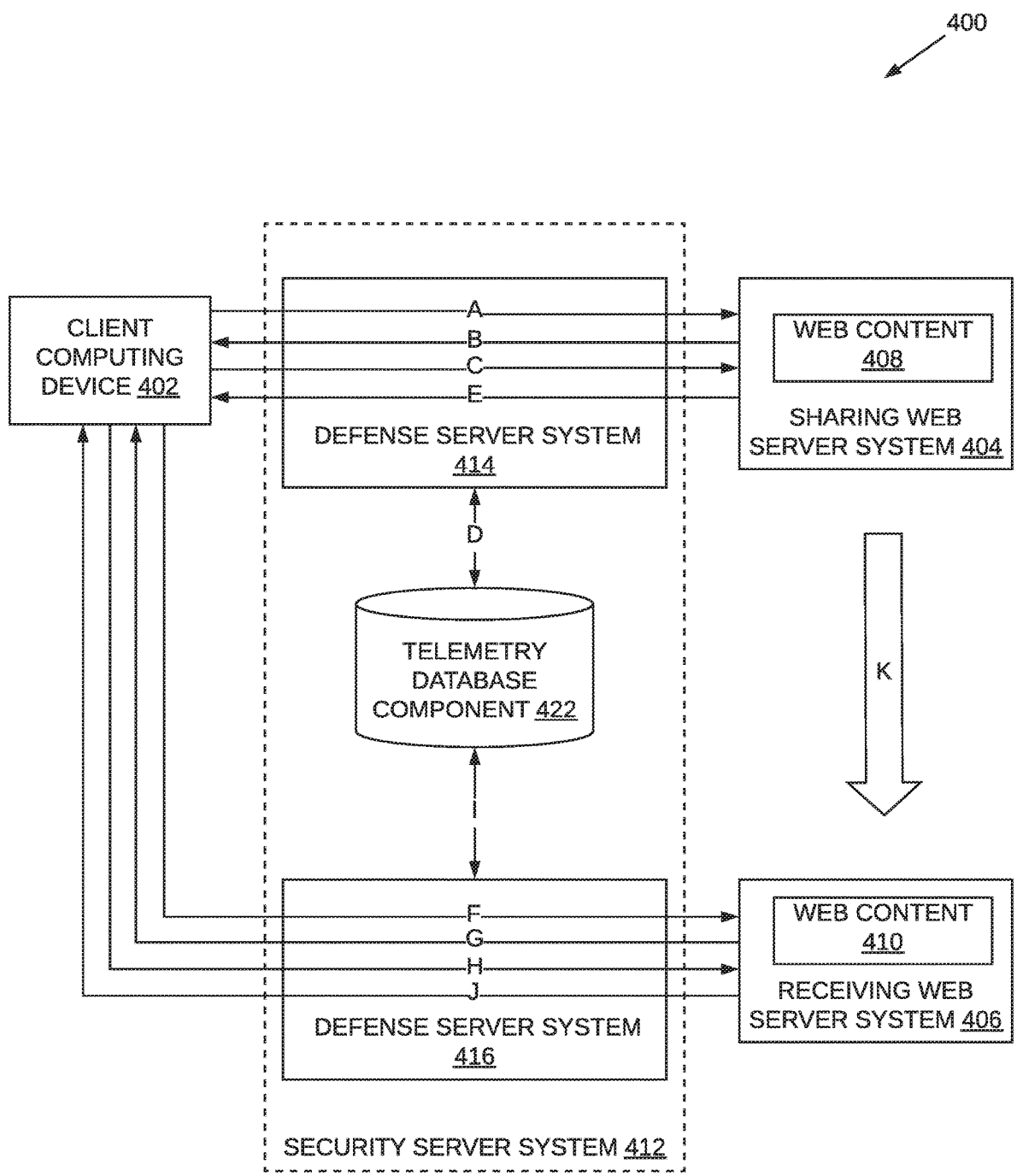
FIG. 4 is a partial block and partial functional diagram of another exemplary system or environment with an example of another security server system that facilitates secure client data transfer to a web server system associated with a defense server system.

4.3 Initiating Secure Client Data Transfer to a Receiving Web Server System Associated with a Defense Server System Referring to FIG. 4, another exemplary system or environment with an example of another security server system 412 that facilitates secure client data transfer to the web server system 406 associated with one of the defense server systems 414-416 is illustrated. In this example, the client computing device 402 in FIG. 4 is the same in structure and operation as the client computing devices 102-104 illustrated and described in the examples in FIGS. 1-2B, except as otherwise illustrated and described by way of the examples herein. Additionally, the security server system 412 in FIG. 4 is the same in structure and operation as the security server system 140 illustrated and described in the examples in FIGS. 1-2B, except as otherwise illustrated and described by way of the examples herein. Further, the web server systems 404-406 in FIG. 4 are the same in structure and operation as the web server systems 112-116 as illustrated and described in the examples in FIGS. 1-2b, except as otherwise illustrated and described by way of the examples herein.

In this example, the computer system 400 includes a security server system 412 that includes a defense server system 414 associated with a sharing web server system 404 and a defense server system 416 associated with a receiving web server system 406, although the system may include other types and/or numbers of system, devices, and/or elements. FIG. 4 also includes a partial functional diagram of an example of a process to initiate secure data transfer. While the paths shown in the flow diagram are discussed in an order, the paths are not necessarily performed in the order discussed, nor are all paths required for facilitating secure client data transfer.

In this example, the security server system 412 initiates secure client data transfer from the sharing web server system 404 to the receiving web server system 406 when the security server system 412 identifies an opportunity for secure client data transfer during an interaction between a client computing device 402 and the receiving web server system 406. The security server system 412 may identify the opportunity for secure client data transfer based on telemetry data for one or more interactions between the client computing device 402 and the sharing web server system 404. For example, the telemetry database component 422 may include telemetry data indicating that the client computing device 402 has successfully logged into an account with the sharing web server system 404.

Exemplary paths A-E illustrated in FIG. 4 relate to an interaction between the client computing device 402 and the sharing web server system 404. After the interaction, telemetry data corresponding to the interaction is stored in the telemetry database component 422. Paths A-E are drawn to indicate that the defense server system 414 is involved in one or more paths of the interaction between the client computing device 402 and the sharing web server system 404 without specifying a particular network configuration between the client computing device 402, the sharing web server system 404, and the associated defense server system 414.

At path A, the client computing device 402 sends a first request for web content 408 hosted by the sharing web server system 404. The web content 408 may include web code that can initiate a monitored interaction. For example, when a login request to the sharing web server system 404 is a monitored interaction, the web content 408 may include a login interface that a user can use to initiate a login request. At path B, the sharing web server system 404 sends a response to the client computing device 402 that includes the requested web content 408, and the defense server system 414 associated with the sharing web server system 404 provides instrumentation code in association with the web content 408. In some examples, the instrumentation code is integrated with the web content 408 such that the instrumentation code executes at the client computing device 402 when the web content 408 executes at the client computing device 402.

At path C, the client computing device 402 provides telemetry data collected at the client computing device 402 when the instrumentation code executes at the client computing device 402. In some examples, the client computing device 402 provides the telemetry data in, or in association with, a second request that is a monitored interaction that is initiated from the web content 408. At path D, the defense server system 414 stores telemetry data corresponding to the interaction in the telemetry database component 422. In some examples, the telemetry data is stored in association with an outcome, success status, or other metadata about the second request by way of example only. The telemetry data may include an IDSD and/or identifying signal values usable to generate an IDSD for the second request. At path E, the sharing web server system 404 responds to the second request.

Exemplary paths F-J relate to an interaction between the client computing device 402 and the receiving web server system 406. Paths F-J are drawn to indicate that the defense server system 416 is involved in one or more paths of the interaction between the client computing device 402 and the receiving web server system 406 without specifying a particular network configuration between the client computing device 402, the receiving web server system 406, and the associated defense server system 416.

At path F, the client computing device 402 sends a third request for web content 410 hosted by the receiving web server system 406. The third request may related to a second monitored interaction. For example, the second monitored interaction may include viewing a shopping cart at the receiving web server system 406. The web content 410 may include web code that initiates the second monitored interaction. For example, the web content 410 may render a button that navigates to a shopping cart view when the button is clicked.

At path G, the receiving web server system 406 sends a response to the client computing device 402 that includes the requested web content 410, and the defense server system 416 associated with the receiving web server system 406 provides instrumentation code in association with the web content 410. For example, the instrumentation code may be integrated with the web content 410 such that the instrumentation code executes at the client computing device 402 when the web code 410 executes at the client computing device 402.

At path H, the client computing device 402 provides telemetry data collected at the client computing device 402 when the instrumentation code executes at the client computing device 402. In some examples, the client computing device 402 provides the telemetry data in, or in association with, a fourth request when the second monitored interaction that is initiated from the web content 410. The security server system 412 and/or defense server system 416 may generate an IDSD corresponding to the fourth request based on the telemetry data.

At path I, the defense server system 416 determines whether the telemetry data component 422 includes telemetry data corresponding to the client computing device 402 and the sharing web server system 404 based on the IDSD generated for the fourth request. For example, the telemetry database component 422 may include telemetry data stored in association with the second request from the client computing device 402 to the sharing web server system 404. Based on matching telemetry data for one or more interactions with a matching IDSD, the defense server system 416 may initiate secure client data transfer for client data associated with a client computing device 402, shown at path K. For example, the secure client data transfer may relate to initiating checkout based on account data for a user of the client computing device 402 at the sharing web server system 404. Example techniques for transferring client data are described in greater detail hereinafter.

At path J, the sharing web server system 406 responds to the fourth request. The response may take into account that the defense server system 416 has determined that secure client data transfer may be initiated. For example, the response may include an interface for communicating with the client computing device 402 about aspects of secure client data transfer, such as to obtain consent to transfer client data from the sharing web server system 404 usable to checkout at the receiving web server system 406.

Figure 5:
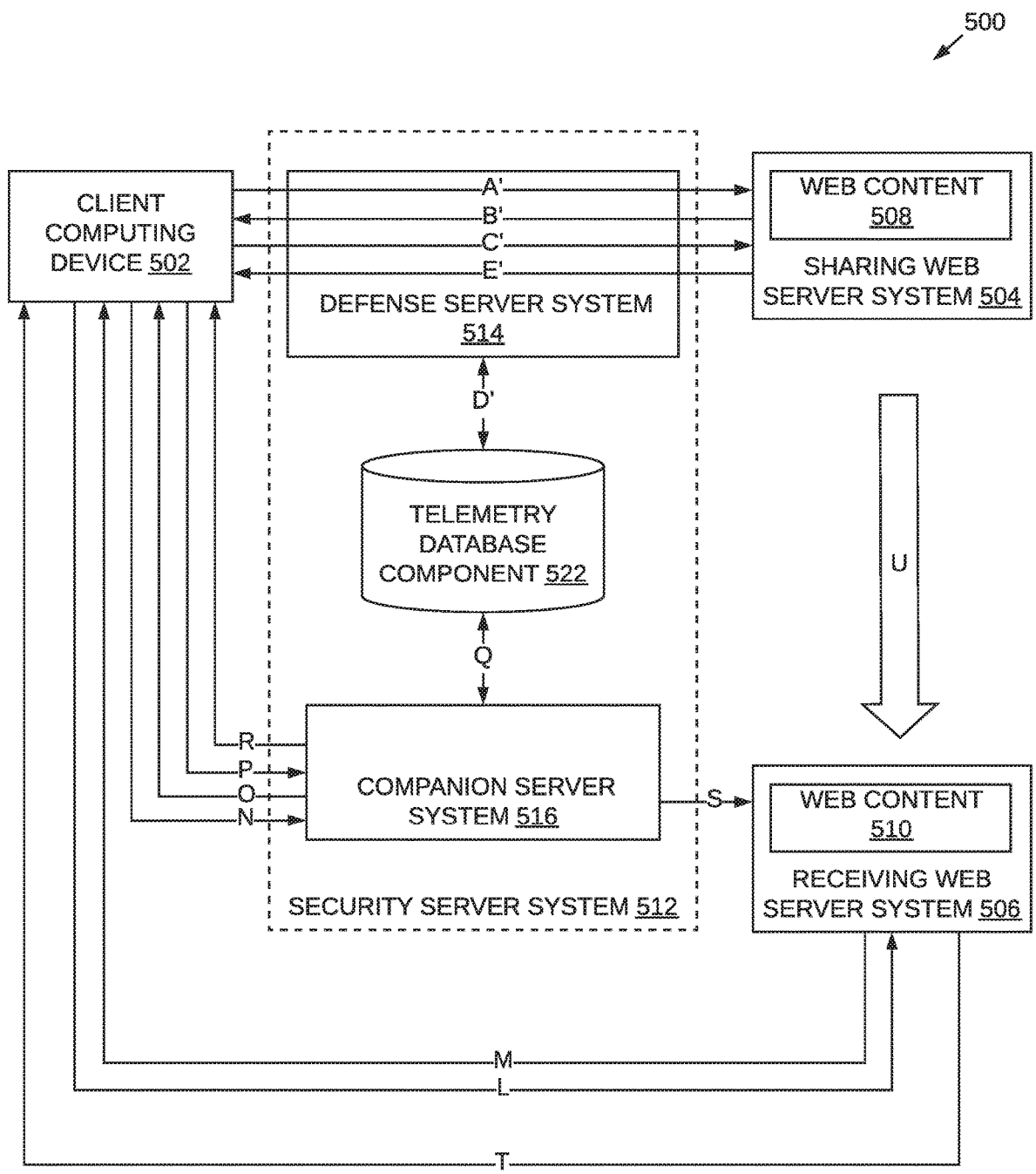
FIG. 5 is a partial block and partial functional diagram of an example of another system or environment with another security server system that facilitates secure client data transfer to a receiving web server system associated with a companion server.

4.4 Initiating Secure Client Data Transfer to a Receiving Web Server System Associated with a Companion Server System Referring to FIG. 5, another exemplary system or environment with an example of another security server system 512 that facilitates secure client data transfer to the web server system 506 associated with a companion server system 516 is illustrated. In this example, the client computing device 502 (for ease of illustration shown as one block) in FIG. 5 is the same in structure and operation as the client computing devices 102-104 illustrated and described in the examples in FIGS. 1-2B, except as otherwise illustrated and described by way of the examples herein. Additionally, the security server system 512 in FIG. 5 is the same in structure and operation as the security server system 140 illustrated and described in the examples in FIGS. 1-2B, except as otherwise illustrated and described by way of the examples herein. Further, the web server systems 504-506 in FIG. 5 are the same in structure and operation as the web server systems 112-116 as illustrated and described in the examples in FIGS. 1-2b, except as otherwise illustrated and described by way of the examples herein.

The computer system 500 includes a security server system 512 which has a defense server system 514 associated with a sharing web server system 504 and a companion server system 516 associated with a receiving web server system 506, although the system may include other types and/or numbers of system, devices, and/or elements. FIG. 5 also includes a partial functional diagram of an example process to initiate secure data transfer. While the paths shown in the flow diagram are discussed in an order, the paths are not necessarily performed in the order discussed, nor are all paths required for facilitating secure client data transfer.

The security server system 512 initiates secure client data transfer from the sharing web server system 504 to the receiving web server system 506 when the security server system 512 identifies an opportunity for secure client data transfer during an interaction between a client computing device 502 and the receiving web server system 506. The security server system 512 may identify the opportunity for secure client data transfer based on telemetry data for one or more interactions between the client computing device 502 and the sharing web server system 504.

Exemplary paths A'-E' relate to an interaction between the client computing device 502 and the sharing web server system 504. After the interaction, telemetry data corresponding to the interaction is stored in the telemetry database component 552. Paths A'-E' are drawn to indicate that the defense server system 514 is involved in one or more paths of the interaction between the client computing device 502 and the sharing web server system 504 without specifying a particular network configuration between the client computing device 502, the sharing web server system 504, and the associated defense server system 514.

At path A', the client computing device 502 sends a request for web content 508 hosted by the sharing web server system 504. The web content 508 may include web code that can initiate a monitored interaction with the sharing web server system 504. For example, when a login request to the sharing web server system 504 is a monitored interaction, the web content 508 may include a login interface that a user can use to initiate a login request. At path B', the sharing web server system 504 sends a response to the client computing device 502 that includes the requested web content 508, and the defense server system 514 associated with the sharing web server system 504 provides instrumentation code in association with the web content 508. At path C', the client computing device 502 provides telemetry data collected at the client computing device 502 when the instrumentation code executes at the client computing device 502. At path D', the defense server system 514 stores the telemetry data corresponding to the interaction in the telemetry database component 522. The telemetry data may include an IDSD and/or identifying signal values usable to generate an IDSD for the subsequent request. In some examples, the telemetry data is stored in association with data about the subsequent request. At path E', the sharing web server system 504 responds to the subsequent request.

Exemplary paths L-T relate to an interaction between the client computing device 502 and the receiving web server system 506. Paths L-S are drawn to indicate that the companion server system 516 is involved in one or more paths of the interaction between the client computing device 502 and the receiving web server system 506 without specifying a particular network configuration between the client computing device 502, the receiving web server system 506, and the associated companion server system 516.

At path L, the client computing device 502 sends a request for web content 510 hosted by the receiving web server system 506. The web content 510 may include web code that can initiate a monitored interaction with the receiving web server system 506. At path M, the receiving web server system 506 sends a response to the client computing device 502 that includes the requested web content 510. In some examples, the web content 510 may include instructions that redirect the client computing device 502 to the companion server system 516 associated with the receiving web server system 506. For example, the requested web content 510 may redirect the client computing device 502 to the companion server system 516 when the client computing device 502 initiates the monitored interaction from the web content 510.

In some examples, the requested web content 510 includes instructions to load an interstitial web page from the companion server system 516. As used herein, the term "interstitial web page" refers to any web content comprising web code that executes before or after the associated web content 510, such as the content requested by the client computing device 502 at path L and/or content expected when the client computing device 502 initiates the monitored interaction. In some examples, the interstitial web page includes instructions to obtain instrumentation code from the companion server system 516 and/or instructions to provide telemetry data to the companion server system 516. The interstitial web page may be configured such that the appearance of the web content 510, as displayed to a user on the client computing device 502, is not substantially altered. For example, the interstitial web page may have no rendered elements or minimal rendered elements.

At path N, the client computing device 502 is directed to the companion server system 516, such as when the client computing device 502 initiates the monitored interaction. For example, the client computing device 502 requests an interstitial web page from the companion server system 516 when the client computing device 502 initiates the monitored interaction. The monitored request may be a login request on a login interface presented in the web content 510. The monitored request does not include telemetry data. In contrast to the web content 410 served by the receiving web server system 406 of FIG. 4, the web content 510 served by the receiving web server system 506 was not routed through a defense server system that adds instrumentation code to, or otherwise integrates instrumentation code with the web content 510.

At path O, in response to receiving the monitored request from the client computing device 502, the companion server system 516 provides instrumentation code to the client computing device 502. For example, in response to the request at path N, the companion server system 516 may provide an interstitial web page to the client computing device 502. The interstitial web page includes instrumentation code that executes on the client computing device 502 and collects telemetry data at the client computing device 502. In some examples, the instrumentation code causes the collection and transmission of the telemetry data without additional action by a user of the client computing device 502.

At path P, the client computing device 502 provides telemetry data collected at the client computing device 502 when the instrumentation code executes at the client computing device 502. In some examples, the set of telemetry signal values collected by a companion server system 516 is smaller than the set of telemetry signal values collected by a defense server system 514. For example, a defense server system 514 may use a broader set of telemetry signal values to provide security services to security service customers, while a companion server system 516 may use a truncated set of telemetry signal values to implement IDSD matching for secure client data transfer. The security server system 512 and/or the companion server system 516 may generate an IDSD based on the telemetry data.

At path Q, the companion server system 516 determines whether the telemetry data component 522 includes telemetry data corresponding to the client computing device 502 and the sharing web server system 504 based on the IDSD. For example, the telemetry database component 522 may include telemetry data stored in association with the interaction of paths A'-E' between the client computing device 502 to the sharing web server system 504. Based on matching telemetry data for one or more interactions with a matching IDSD, the companion server system 516 may initiate secure client data transfer for client data associated with a client computing device 502, shown at path U. Example techniques for transferring client data are described in greater detail hereinafter.

At path R, the companion server system 516 may set an interstitial cookie indicating that an IDSD has been generated and processed in association with an interaction between the client computing device 502 and the receiving web server system 506. The interstitial cookie may have encrypted device data specific to the client computing device 502, allowing the security server system 512 to prevent the usage of the interstitial cookie on another client computing device. In some examples, the interstitial cookie is time-limited or use-limited to prevent misuse.

At path S, the companion server system 516 provides information on the monitored request and/or the telemetry data matching to the receiving web server system 506. For example, the companion server system 516 may forward the monitored request to the receiving web server system 506. At path T, the receiving web server system 506 responds to the monitored request. The response may take into account that the companion server system 516 has determined that secure client data transfer may be initiated. For example, the response may include an interface for communicating with the client computing device 502 about aspects of secure client data transfer. Secure client data transfer is described in greater detail hereinafter.

4.5 Secure Client Data Transfer Using a Data Access Application Programming Interface (API)

Figure 6:
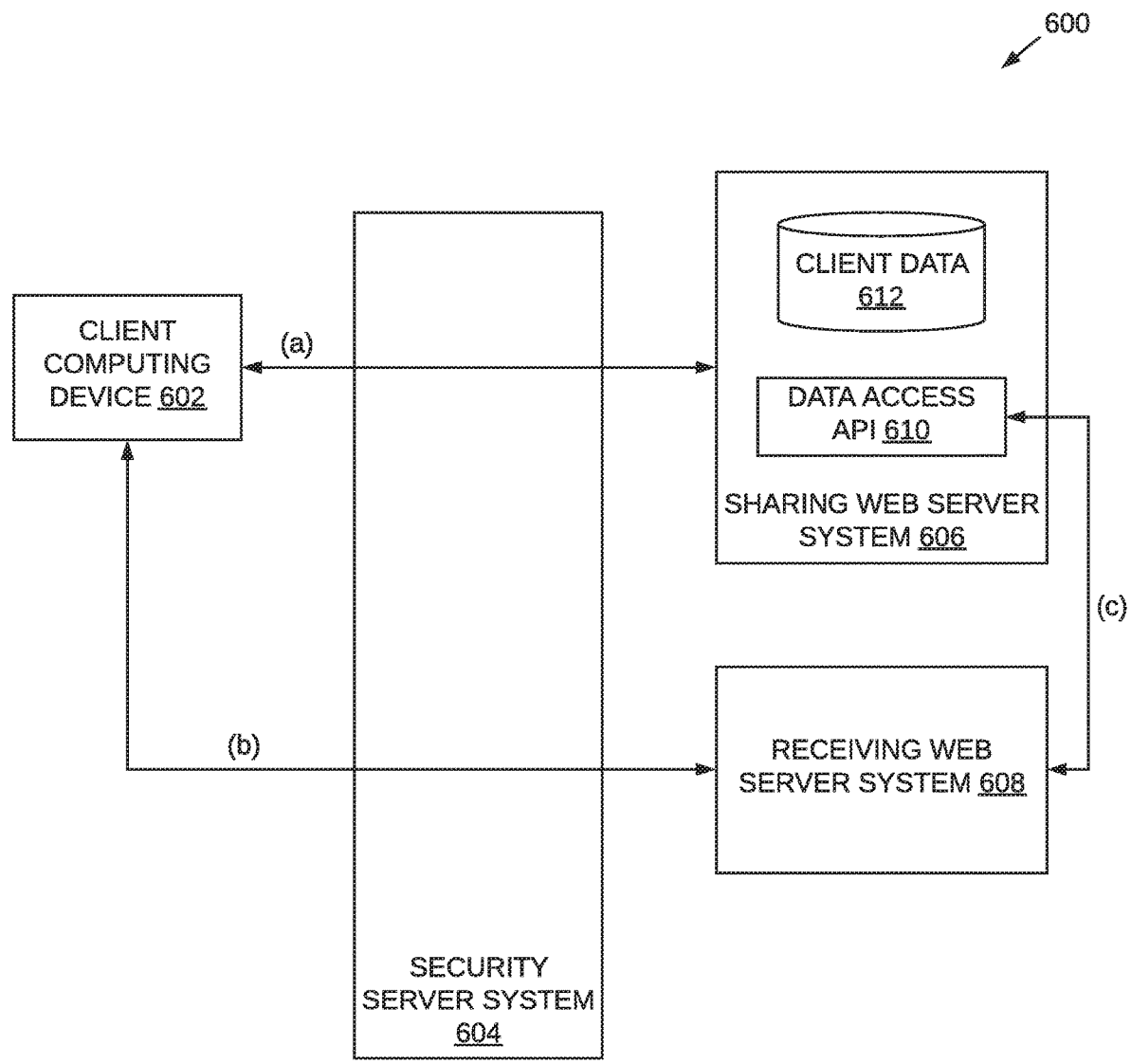
FIG. 6 is a is a partial block and partial functional diagram of an example of another system or environment with another security server system that facilitates secure client data transfer using a data access application programming interface (API)

Referring to FIG. 6, another exemplary system or environment with an example of another security server system 604 that facilitates secure client data transfer to the web server system 608 using a data access application programming interface (API) is illustrated. In this example, the client computing devices 602 is the same in structure and operation as the client computing devices 102-104 illustrated and described in the examples in FIGS. 1-2B, except as otherwise illustrated and described by way of the examples herein. Additionally, the security server system 604 in FIG. 6 is the same in structure and operation as the security server system 140 illustrated and described in the examples in FIGS. 1-2B, except as otherwise illustrated and described by way of the examples herein. Further, the web server systems 606-608 in FIG. 6 are the same in structure and operation as the web server systems 112-116 as illustrated and described in the examples in FIGS. 1-2b, except as otherwise illustrated and described by way of the examples herein.

In this example, the computer system 600 includes a client computing device 602, a security server system 604, a sharing web server system 606, and a receiving web server system 608, although the system may include other types and/or numbers of system, devices, and/or elements. FIG. 6 also includes a partial functional diagram illustrating paths (a)-(c) between elements of the computer system 600. Each path of FIG. 6 may include one or more individual communications over one or more sessions. While the paths shown in the flow diagram are discussed in an order, the paths are not necessarily performed in the order discussed, nor are all paths required for facilitating secure client data transfer.

The security server system 604 facilitates secure client data transfer between the sharing web server system 606 and the receiving web server system 608. For example, the security server system 604 may initiate secure client data transfer in the manner shown in FIG. 4 and/or FIG. 5. The sharing web server system 606 includes a data access API 610 which allows the receiving web server system 608 to access client data 612 stored by the sharing web server system 606. For example, the data access API 610 may specify HTTP request messages and response messages for requesting and receiving client data 612.

During a current interaction (b) between the client computing device 602 and the receiving web server system 608, the security server system 604 may determine that a user of the client computing device 602 likely has an account with the sharing web server system 606 based on matching telemetry data for a prior interaction (a) between the client computing device 602 and the sharing web server system 606 that matches an IDSD generated based on telemetry data corresponding to the current interaction (b). In some examples, after matching the IDSD, the security server system 604 obtains authorization from the client computing device 602 to transfer client data from the sharing web server system 606 to the receiving web server system 608.

At path (c), the receiving web server system 608 uses the data access API 610 to request and receive client data 612 relating to the client computing device 602 of interaction (b). The security server system 604 may authorize the receiving web server system 608 to connect to the sharing web server system 606 by using the data access API 610 to request client data 612 relating to the client computing device 602. For example, the security server system 604 may communicate to the sharing web server system 606 that the receiving web server system 606 is authorized to request client data 612 relating to the client computing device 602 via the data access API 610. In some examples, the security server system 604 issues a cookie, token, or other secure key value to the receiving web server system 608 that allows the receiving web server system 608 to request client data 612 relating to the client computing device 602 via the data access API 610.

Figure 7:
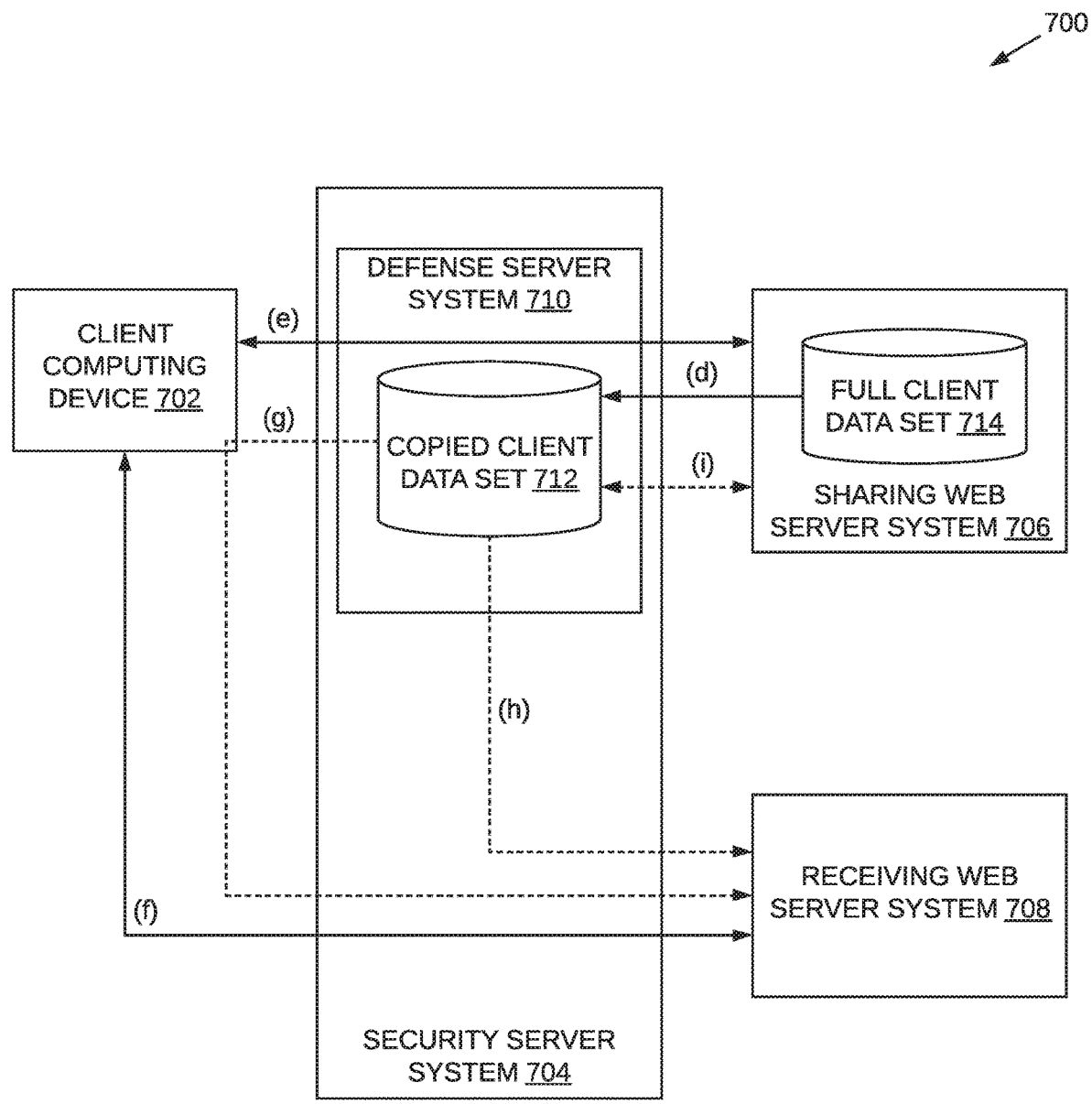
FIG. 7 is a is a partial block and partial functional diagram of an example of another system or environment with another security server system that facilitates secure client data transfer using stored client date.

4.6 Secure Client Data Transfer Using Data Stored by the Security Server System Referring to FIG. 7, another exemplary system or environment with an example of another security server system 704 that facilitates secure client data transfer to one of the web server systems 708 using stored client data is illustrated. In this example, the client computing device 702 (for ease of illustration shown as one block) in FIG. 7 is the same in structure and operation as the client computing devices 102-104 illustrated and described in the examples in FIGS. 1-2B, except as otherwise illustrated and described by way of the examples herein. Additionally, the security server system 704 in FIG. 7 is the same in structure and operation as the security server system 140 illustrated and described in the examples in FIGS. 1-2B, except as otherwise illustrated and described by way of the examples herein. Further, the web server systems 706-708 in FIG. 7 are the same in structure and operation as the web server systems 112-116 as illustrated and described in the examples in FIGS. 1-2b, except as otherwise illustrated and described by way of the examples herein.

In this example, the computer system 700 includes a client computing device 702, a security server system 704, a sharing web server system 706, and a receiving web server system 708, although the system may include other types and/or numbers of system, devices, and/or elements. FIG. 7 also includes a functional diagram illustrating exemplary paths (d)-(i) between elements of the computer system 700. Each path of FIG. 7 may include one or more individual communications over one or more sessions. While the paths shown in the functional diagram are discussed in an order, the paths are not necessarily performed in the order discussed, nor are all paths required for facilitating secure client data transfer.

The security server system 704 facilitates secure client data transfer between the sharing web server system 706 and the receiving web server system 708. For example, the security server system 704 may initiate secure client data transfer in the manner shown in FIG. 4 and/or FIG. 5. The security server system 704 may store a copied client data set 712 to facilitate secure data transfer to a receiving web server system 708. For example, the sharing web server system 706 may be associated with a defense server system 710 that stores the copied client data set 712 within the security server system 704. In some examples, the copied client data set 712 is stored in another component of the security server system 704. The sharing web server system 706 may provide and/or update the copied client data set 712 stored at the security server system 704, as shown by path (d).

The copied client data set 712 includes at least a subset of a full client data set 714 maintained by the sharing web server system 706. In some examples, the copied client data set 712 includes one or more types of client data that the sharing web server system 706 makes available for secure client data transfer to one or more receiving web server systems 708. For example, when the sharing web server system 706 is operated by a credit card company, the sharing web server system 706 may share payment information, such as an address, account number, and/or an expiration date. The sharing web server system 706 may maintain other client in the full client data set 714 that is not in the copied client data set 712.

During a current interaction (f) between the client computing device 702 and the receiving web server system 708, the security server system 704 may determine that a user of the client computing device 702 likely has an account with the sharing web server system 706 based on matching telemetry data for a prior interaction (e) between the client computing device 702 and the sharing web server system 706 that matches an IDSD generated based on telemetry data corresponding to the current interaction (f).

In some examples, after matching the IDSD, the security server system 704 obtains consent and/or authorization from the client computing device 702 to transfer client data from the sharing web server system 706 to the receiving web server system 708. Exemplary Paths (g), (h), and (i) show different example techniques to transfer client data from the copied client data set 712 at the security server system 704 to the receiving web server system 708.

4.6.1 Secure Transfer of Stored Data Via the Client Computing Device

Path (g) involves secure transfer of stored client data via the client computing device 702. At path (g), client data in the copied client data set 712 that corresponds to the client computing device 702 is transferred to the client computing device 702 and submitted to the receiving web server system 708 by a user of the client computing device 702. For example, when interaction (f) involves finalizing a purchase with the receiving web server system 708, the security server system 704 may provide an account number for a particular account with the sharing web server system 706 for display in a web interface at the client computing device 702, and the user may click a button to authorize submission of the account number to the receiving web server system 708. In some examples, the security server system 704 populates a web form from the receiving web server system 708 at the client computing device 702 with the client data. The user authorizes submission of the client data by submitting the web form to the receiving web server system 708.

4.6.2 Direct Secure Transfer of Stored Data

Path (h) involves secure transfer of stored client data directly to the receiving web server system 708. At path (h), client data in the copied client data set 712 that corresponds to the client computing device 702 is transferred to the receiving web server system 708 without first passing the data to the client computing device 702. In some examples, the security server system 704 obtains authorization from the client computing device 702 to transfer client data from the sharing web server system 706 to the receiving web server system 708 without sending the client data itself to the client computing device 702. During an interaction between the client computing device 702 and a receiving web server system 708, the security server system 704 may notify the client computing device 702 that particular data is available to share to the receiving web server system 708.

For example, when a user of the client computing device 702 interacts with a receiving web server system 708 operated by an entity that provides services covered by insurance, the security server system 704 may determine that a user of the client computing device 702 likely is insured by an insurance company that operates the sharing web server system. The security server system 704 may then notify the client computing device 702 that insurance coverage information is available to share with the entity that provides services covered by insurance.

4.6.3 Secure Transfer Using Stored Login Data

The copied client data set 712 may include login credentials for an account with the sharing web server system 706 that is associated with the client computing device 702. For example, at path (i), the security server system 704 may use the stored credentials to log in to the corresponding account at the sharing web server system 706 to access and share client data stored in the full client data set 714. In some examples, the security server system 704 obtains authorization from the client computing device 702 to transfer client data from the sharing web server system 706 to the receiving web server system 708 before obtaining the data from the sharing web server system 706 using the login credentials. The client data accessed using the login credentials may be provided to the receiving web server system 708 via the client computing device 702 (such as at path (g)), or may be provided directly to the receiving web server system 708 (such as at path (h)).

5.0 Example Processes

Figure 8:
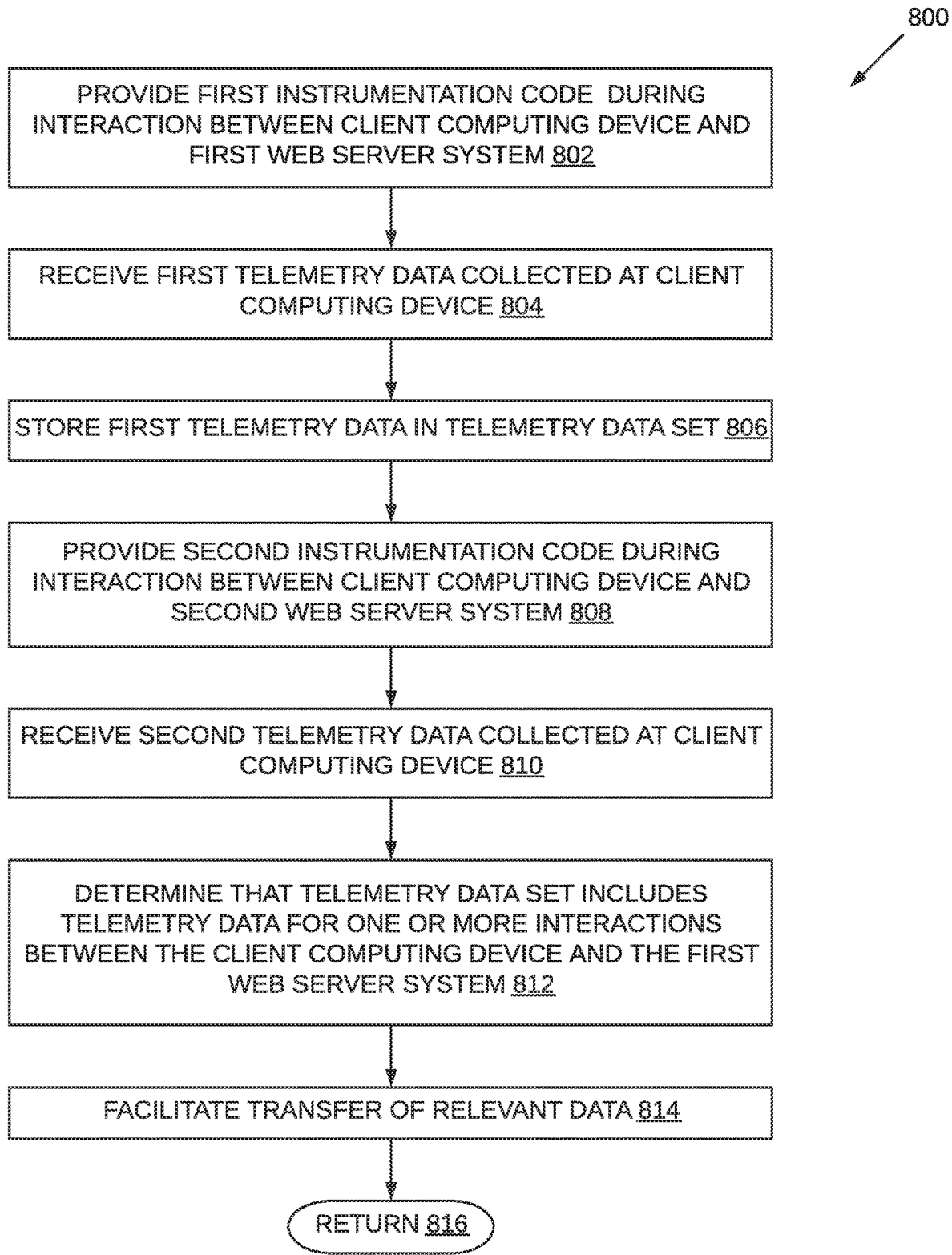
FIG. 8 is a flow chart of an example of a method for facilitating secure client data transfer.

Referring to FIG. 8, a flow chart of an example of a method for facilitating secure client data transfer is illustrated. In this example, the method 800 may be performed by one or more computing devices and/or processes thereof. For example, one or more steps of method 800 may be performed by a computer system, such as but not limited to computer system 900. In some examples, one or more steps of method 800 are performed by a security server system, which may include one or more defense server systems, companion server systems, and/or analysis server systems as illustrated and described by way of the examples herein. Method 800 will be described with respect to security server system 140, but is not limited to performance by such and may, by way of example only, be executed by any of the security server systems 340, 412, 512, 604, and 704.

At step 802, the security server system 140 provides first instrumentation code for one of the client computing devices 102-104 during a first interaction between the one of the client computing devices 102-104 and a first one of the web server systems 112-116. The security server system 140 may provide the first instrumentation code directly to or indirectly to the one of the client computing devices 102-104.

At step 804, the security server system 140 receives first telemetry data collected at the one of the client computing devices 102-104. The first telemetry data is collected when the first instrumentation code is executed at the one of the client computing devices 102-104. In some examples, the first telemetry data includes IDSD that is usable to identify other transactions involving the one of the client computing devices 102-104 or a user of the one of the client computing devices 102-104.

At step 806, the security server system 140 stores the first telemetry data in a telemetry data set. The telemetry data set includes telemetry data for a plurality of interactions between a plurality of client computing devices 102-104 and a plurality of web server systems 112-116, and/or a plurality of users and a plurality of web server systems 112-116.

At step 808, the security server system 140 provides second instrumentation code for the one of the client computing devices 102-104 during a second interaction between one of the client computing devices 102-104 and a second one of the web server systems 112-116. The security server system 140 may provide the second instrumentation code directly to or indirectly to the one of the client computing devices 102-104.

At step 810, the security server system 140 receives second telemetry data collected at the one of the client computing devices 102-104. The second telemetry data is collected when the second instrumentation code is executed at the one of the client computing devices 102-104. In some examples, the second telemetry data includes IDSD that is usable to identify other transactions involving the one of the client computing devices 102-104 or a user of the one of the client computing devices 102-104.

At step 812, the security server system 140 determines that the telemetry data set includes telemetry data for one or more interactions between the one of the client computing devices 102-104 and the first one of the web server systems 112-116. For example, the security server system 140 may identify matching telemetry data that matches the second telemetry data and that is associated with the first one of the web server systems. The matching telemetry data is generated by the same one of the client computing devices 102-104 and/or the same user.

At step 814, the security server system 140 facilitates a transfer of relevant data. The relevant data may include data associated with the one of the client computing devices 102-104 and/or user and the first one of the web server systems 112-116 that is relevant to or otherwise needed for the second interaction to the second one of the web server systems 112-116.

At step 816, method 800 returns and/or terminates. For example, method 800 may pass control to a calling process, generate any appropriate record or notification, return after a method or function invocation, process a next operation requested by one of the client computing devices 102-104, or terminate.

6.0 Implementation Mechanisms—Hardware Overview

According to one example, the techniques described herein are implemented by one or more special-purpose computing devices. The special-purpose computing devices may be hard-wired to perform one or more techniques described herein, including combinations thereof. Alternatively and/or in addition, the one or more special-purpose computing devices may include digital electronic devices such as one or more application-specific integrated circuits (ASICs) or field programmable gate arrays (FPGAs) that are persistently programmed to perform the techniques. Alternatively and/or in addition, the one or more special-purpose computing devices may include one or more general purpose hardware processors programmed to perform the techniques described herein pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices and/or any other device that incorporates hard-wired or program logic to implement the techniques.

Figure 9:
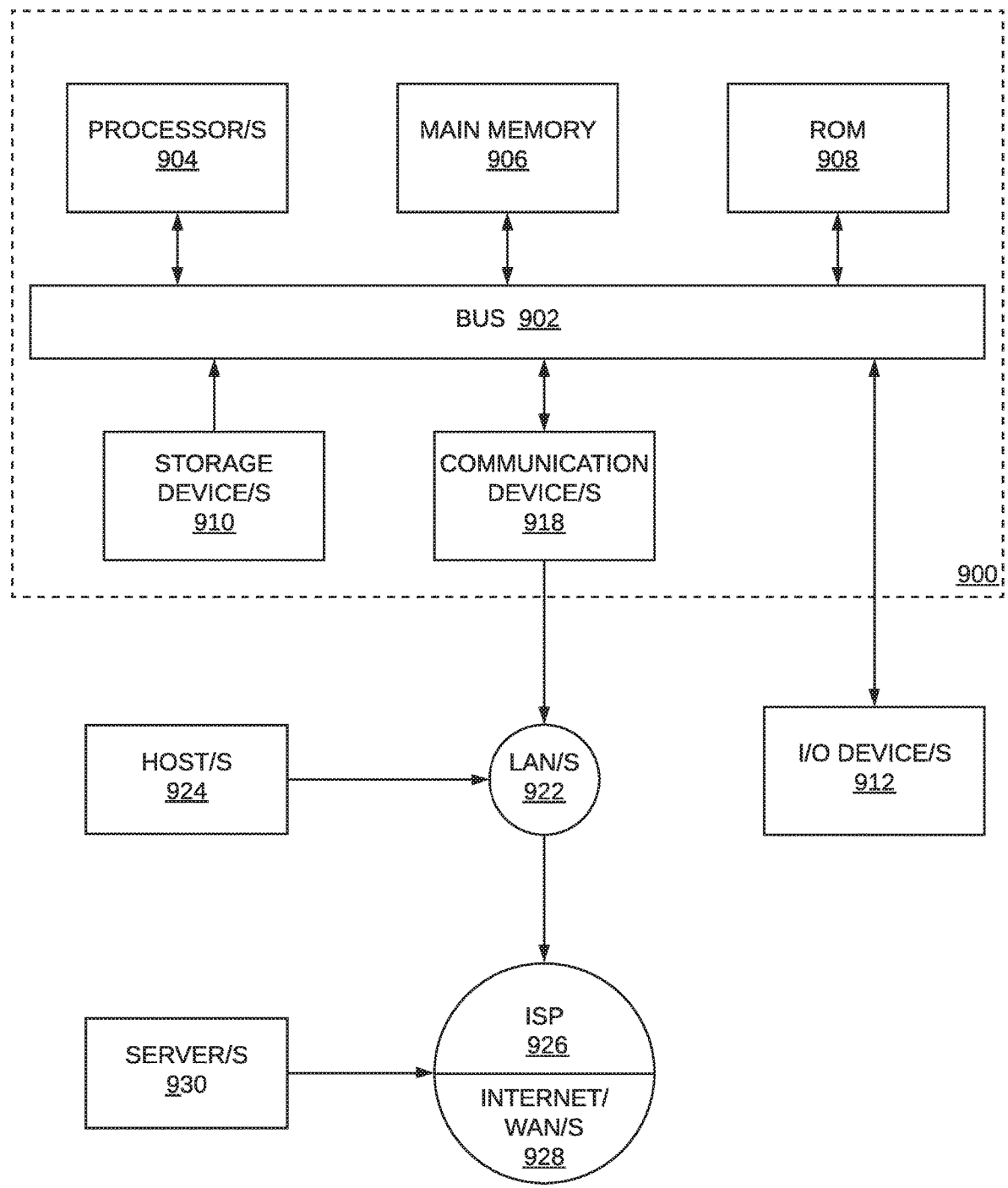
FIG. 9 illustrates an exemplary computer system upon which examples of this technology may be implemented.

FIG. 9 illustrates a computer system upon which an example may be implemented. Computer system 900 includes a bus 902 or other communication mechanism for communicating information, and one or more hardware processors 904 coupled with bus 902 for processing information, such as basic computer instructions and data. Hardware processor(s) 904 may include, for example, one or more general-purpose microprocessors, graphical processing units (GPUs), coprocessors, central processing units (CPUs), and/or other hardware processing units.

Computer system 900 also includes one or more units of main memory 906 coupled to bus 902, such as random access memory (RAM) or other dynamic storage, for storing information and instructions to be executed by processor(s) 904. Main memory 906 may also be used for storing temporary variables or other intermediate information during execution of instructions to be executed by processor(s) 904. Such instructions, when stored in non-transitory storage media accessible to processor(s) 904, turn computer system 900 into a special-purpose machine that is customized to perform the operations specified in the instructions. In some examples, main memory 906 may include dynamic random-access memory (DRAM) (including but not limited to double data rate synchronous dynamic random-access memory (DDR SDRAM), thyristor random-access memory (T-RAM), zero-capacitor (Z-RAM™)) and/or non-volatile random-access memory (NVRAM).

Computer system 900 may further include one or more units of read-only memory (ROM) 908 or other static storage coupled to bus 902 for storing information and instructions for processor(s) 904 that are either always static or static in normal operation but reprogrammable. For example, ROM 908 may store firmware for computer system 900. ROM 908 may include mask ROM (MROM) or other hard-wired ROM storing purely static information, programmable read-only memory (PROM), erasable programmable read-only memory (EPROM), electrically-erasable programmable read-only memory (EEPROM), another hardware memory chip or cartridge, or any other read-only memory unit.

One or more storage devices 910, such as a magnetic disk or optical disk, is provided and coupled to bus 902 for storing information and/or instructions. Storage device(s) 910 may include non-volatile storage media such as, for example, read-only memory, optical disks (such as but not limited to compact discs (CDs), digital video discs (DVDs), Blu-ray discs (BDs)), magnetic disks, other magnetic media such as floppy disks and magnetic tape, solid state drives, flash memory, optical disks, one or more forms of non-volatile random access-memory (NVRAM), and/or other non-volatile storage media.

Computer system 900 may be coupled via bus 902 to one or more input/output (I/O) devices 912. For example, I/O device(s) 912 may include one or more displays for displaying information to a computer user, such as a cathode ray tube (CRT) display, a Liquid Crystal Display (LCD) display, a Light-Emitting Diode (LED) display, a projector, and/or any other type of display.

I/O device(s) 912 may also include one or more input devices, such as an alphanumeric keyboard and/or any other key pad device. The one or more input devices may also include one or more cursor control devices, such as a mouse, a trackball, a touch input device, or cursor direction keys for communicating direction information and command selections to processor 904 and for controlling cursor movement on another I/O device (e.g. a display). This input device typically has at degrees of freedom in two or more axes, (e.g. a first axis x, a second axis y, and optionally one or more additional axes z . . . ), that allows the device to specify positions in a plane. In some examples, the one or more I/O device(s) 912 may include a device with combined I/O functionality, such as a touch-enabled display.

Other I/O device(s) 912 may include a fingerprint reader, a scanner, an infrared (IR) device, an imaging device such as a camera or video recording device, a microphone, a speaker, an ambient light sensor, a pressure sensor, an accelerometer, a gyroscope, a magnetometer, another motion sensor, or any other device that can communicate signals, commands, and/or other information with processor(s) 904 over bus 902.

Computer system 900 may implement the techniques described herein using customized hard-wired logic, one or more ASICs or FPGAs, firmware or program logic which, in combination with the computer system causes or programs, causes computer system 900 to be a special-purpose machine. According to one example, the techniques herein are performed by computer system 900 in response to processor(s) 904 executing one or more sequences of one or more instructions contained in main memory 906. Such instructions may be read into main memory 906 from another storage medium, such as one or more storage device(s) 910. Execution of the sequences of instructions contained in main memory 906 causes processor(s) 904 to perform the process steps described herein. In alternative examples, hard-wired circuitry may be used in place of or in combination with software instructions.

Computer system 900 also includes one or more communication interfaces 918 coupled to bus 902. The one or more communication interface(s) 918 provide two-way data communication over one or more physical or wireless network links 920 that are connected to a local network 922 and/or a wide area network (WAN), such as the Internet. For example, communication interface(s) 918 may include an integrated services digital network (ISDN) card, cable modem, satellite modem, or a modem to provide a data communication connection to a corresponding type of telephone line. Alternatively and/or in addition, communication interface(s) 918 may include one or more of: a local area network (LAN) device that provides a data communication connection to a compatible local network 922; a wireless local area network (WLAN) device that sends and receives wireless signals (such as electrical signals, electromagnetic signals, optical signals or other wireless signals representing various types of information) to a compatible LAN; a wireless wide area network (WWAN) device that sends and receives such signals over a cellular network access a wide area network (WAN, such as the Internet 928); and other networking devices that establish a communication channel between computer system 900 and one or more LANs 922 and/or WANs.

Network link(s) 920 typically provides data communication through one or more networks to other data devices. For example, network link(s) 920 may provide a connection through one or more local area networks 922 (LANs) to one or more host computers 924 or to data equipment operated by an Internet Service Provider (ISP) 926. ISP 926 in turn provides connectivity to one or more wide area networks 928, such as the Internet. LAN(s) 922 and WAN(s) 928 both use electrical, electromagnetic or optical signals that carry digital data streams. The signals through the various networks and the signals on network link(s) 920 and through communication interface(s) 918 are example forms of transmission media, or transitory media.

The term "storage media" as used herein refers to any non-transitory media that stores data and/or instructions that cause a machine to operate in a specific fashion. Such storage media may include volatile and/or non-volatile media. Storage media is distinct from but may be used in conjunction with transmission media. Transmission media participates in transferring information between storage media. For example, transmission media includes coaxial cables, copper wire and fiber optics, including traces and/or other physical electrically conductive components that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its main memory 906 and send the instructions over a telecommunications line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 can send messages and receive data, including program code, through the network(s), network link 920 and communication interface 918. In the Internet example, one or more servers 930 might transmit signals corresponding to data or instructions requested for an application program executed by the computer system 900 through the Internet 928, ISP 926, local network 922 and a communication interface 918. The received signals may include instructions and/or information for execution and/or processing by processor(s) 904. Processor(s) 904 may execute and/or process the instructions and/or information upon receiving the signals by accessing main memory 906, or at a later time by storing them and then accessing them from storage device(s) 910.

7.0 Other Aspects of Disclosure

In the foregoing specification, examples of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method implemented by a security system comprising one or more security server devices, web server systems, or client computing devices, the method comprising:
   receiving first telemetry data collected at a client when
      first instrumentation code provided to the client during a first interaction with a first web server system is executed at the client, wherein the client comprises a client computing device;

storing the first telemetry data in a telemetry data set comprising telemetry data for one or more interactions between a plurality of clients and a plurality of web server systems;

receiving second telemetry data collected at the client when second instrumentation code provided to the client during a second interaction with a second web server system is executed at the client;

determining when the second telemetry data matches the first telemetry data stored in the telemetry data set indicating that a same client computing device or a same user engaged in the first interaction with the first web server system and the second interaction with the second web server system; and facilitating a transfer of data associated with the client and the first web server system that is relevant to or otherwise needed for the second interaction to the second web server system when the determination indicates the second telemetry data matches the first telemetry data stored in the telemetry data set.

2. The method of claim 1, wherein the determining that the telemetry data set includes stored telemetry data for one or more interactions between the client and the first web server system that corresponds to the second telemetry data matches the first telemetry data stored in the telemetry data set further comprises:

generating particular identifying signal data (IDSD) for the second telemetry data; and identifying, in the telemetry data set, stored telemetry data of the first telemetry data with IDSD matching the particular IDSD.

3. The method of claim 1, wherein the facilitating the transfer of relevant data further comprises:

requesting authorization for the transfer of relevant data from the client comprising presenting information for a first user account and the first web server in an iframe of a webpage served by the second web server system or authorizing the second web server system to use an application programming interface (API) of the first web server system to obtain the relevant data.

4. The method of claim 1, further comprising:

receiving, from the first web server system, and storing data corresponding to a plurality of user accounts for the first web server system;

wherein the facilitating the transfer of relevant data further comprises providing particular stored data associated with the client and the first web server system to the second web server system and wherein the particular stored data is provided in an inline frame element (iframe) or providing particular stored client data associated with the client and the first web server system to the client to facilitate submission of the particular stored data to the second web server system from the client.

5. The method of claim 1, further comprising:

receiving, from the first web server system, and storing login data corresponding to a plurality of user accounts for the first web server system;

wherein the facilitating the transfer of relevant data further comprises obtaining particular data from the first web server system using particular login data corresponding to the client.

6. A security server apparatus, comprising memory comprising programmed instructions stored thereon and one or more processors configured to be capable of executing the stored programmed instructions to:

receive first telemetry data collected at a client when first instrumentation code provided to the client during a first interaction with a first web server system is executed at the client;

store the first telemetry data in a telemetry data set comprising telemetry data for one or more interactions between a plurality of clients and a plurality of web server systems;

receive second telemetry data collected at the client when second instrumentation code provided to the client during a second interaction with a second web server system is executed at the client;

determine when the second telemetry data matches the first telemetry data stored in the telemetry data set indicating that a same client computing device or a same user engaged in the first interaction with the first web server system and the second interaction with the second web server system; and facilitate a transfer of data associated with the client and the first web server system that is needed for the second interaction to the second web server system when the determination indicates the second telemetry data matches the first telemetry data stored in the telemetry data set.

7. The apparatus of claim 6, wherein for the determine that the telemetry data set includes stored telemetry data for at least one of the one or more interactions between the client and the first web server system that corresponds to the second telemetry data matches the first telemetry data stored in the telemetry data set, the processors are further configured to be capable of executing the stored programmed instructions to:

generate particular identifying signal data (IDSD) for the second telemetry data; and identify, in the telemetry data set, stored telemetry data with IDSD matching the particular IDSD.

8. The apparatus of claim 6, wherein for the facilitate the transfer of relevant data, the processors are further configured to be capable of executing the stored programmed instructions to:

request authorization for the transfer of relevant data from the client comprising presenting information for a first user account and the first web server in an iframe of a webpage served by the second web server system or authorizing the second web server system to use an application programming interface (API) of the first web server system to obtain the relevant data.

9. The apparatus of claim 6, wherein the processors are further configured to be capable of executing the stored programmed instructions to:

receive, from the first web server system, and storing data corresponding to a plurality of user accounts for the first web server system;

wherein the facilitate the transfer of relevant data further comprises provide particular stored data associated with the client and the first web server system to the second web server system and wherein the particular stored data is provided in an inline frame element (iframe) or providing particular stored client data associated with the client and the first web server system to the client to facilitate submission of the particular stored data to the second web server system from the client.

10. The apparatus of claim 6, wherein the processors are further configured to be capable of executing the stored programmed instructions to:
- receive, from the first web server system, and storing login data corresponding to a plurality of user accounts for the first web server system;
- wherein the facilitate the transfer of relevant data comprises obtaining particular data from the first web server system using particular login data corresponding to the client.

11. A non-transitory computer readable medium having stored thereon instructions for facilitating secure client data transfer comprising executable code that, when executed by one or more processors, causes the processors to:
- receive first telemetry data collected at a client when first instrumentation code provided to the client during a first interaction with a first web server system is executed at the client;
- store the first telemetry data in a telemetry data set comprising telemetry data for one or more interactions between a plurality of clients and a plurality of web server systems;
- receive second telemetry data collected at the client when second instrumentation code provided to the client during a second interaction with a second web server system is executed at the client;
- determine when the second telemetry data matches the first telemetry data stored in the telemetry data set indicating that a same client computing device or a same user engaged in the first interaction with the first web server system and the second interaction with the second web server system; and
- facilitate a transfer of data associated with the client and the first web server system that is needed for the second interaction to the second web server system when the determination indicates the second telemetry data matches the first telemetry data stored in the telemetry data set.

12. The non-transitory computer readable medium of claim 11, wherein for the determine that the telemetry data set includes stored telemetry data for at least one of the one or more interactions between the client and the first web server system that corresponds to the second telemetry data matches the first telemetry data stored in the telemetry data set, the executable code, when executed by the processors further causes the processors to:
- generate particular identifying signal data (IDSD) for the second telemetry data; and
- identify, in the telemetry data set, stored telemetry data of the first telemetry data with IDSD matching the particular IDSD.

13. The non-transitory computer readable medium of claim 11,
- wherein for the facilitate the transfer of relevant data, the executable code, when executed by the processors further causes the processors to:
- request authorization for the transfer of relevant data from the client comprising presenting information for a first user account and the first web server in an iframe of a webpage served by the second web server system or authorizing the second web server system to use an application programming interface (API) of the first web server system to obtain the relevant data.

14. The non-transitory computer readable medium of claim 11, wherein the executable code, when executed by the processors further causes the processors to:
- receive, from the first web server system, and storing data corresponding to a plurality of user accounts for the first web server system;
- wherein the facilitate the transfer of relevant data further comprises provide particular stored data associated with the client and the first web server system to the second web server system and wherein the particular stored data is provided in an inline frame element (iframe) or providing particular stored client data associated with the client and the first web server system to the client to facilitate submission of the particular stored data to the second web server system from the client.

15. The non-transitory computer readable medium of claim 11, wherein the executable code, when executed by the processors further causes the processors to:
- receive, from the first web server system, and storing login data corresponding to a plurality of user accounts for the first web server system;
- wherein the facilitate the transfer of relevant data comprises obtaining particular data from the first web server system using particular login data corresponding to the client.

16. A security system, comprising one or more security server apparatuses, server devices, or clients with memory comprising programmed instructions stored thereon and one or more processors configured to be capable of executing the stored programmed instructions to:
- receive first telemetry data collected at a client when first instrumentation code provided to the client during a first interaction with a first web server system is executed at the client;
- store the first telemetry data in a telemetry data set comprising telemetry data for one or more interactions between a plurality of clients and a plurality of web server systems;
- receive second telemetry data collected at the client when second instrumentation code provided to the client during a second interaction with a second web server system is executed at the client;
- determine when the second telemetry data matches the first telemetry data stored in the telemetry data set indicating that a same client computing device or a same user engaged in the first interaction with the first web server system and the second interaction with the second web server system; and
- facilitate a transfer of data associated with the client and the first web server system that is needed for the second interaction to the second web server system when the determination indicates the second telemetry data matches the first telemetry data stored in the telemetry data set.

17. The system of claim 16, wherein for the determine that the telemetry data set includes stored telemetry data for at least one of the one or more interactions between the client and the first web server system that corresponds to the second telemetry data matches the first telemetry data stored in the telemetry data set the processors are further configured to be capable of executing the stored programmed instructions to:
- generate particular identifying signal data (IDSD) for the second telemetry data; and
- identify, in the telemetry data set, stored telemetry data of the first telemetry data with IDSD matching the particular IDSD.

18. The system of claim 16, wherein for the facilitate the transfer of relevant data the processors are further configured to be capable of executing the stored programmed instructions to:
request authorization for the transfer of relevant data from the client comprising presenting information for a first user account and the first web server in an iframe of a webpage served by the second web server system or authorizing the second web server system to use an application programming interface (API) of the first web server system to obtain the relevant data.

19. The system of claim 16, wherein the processors are further configured to be capable of executing the stored programmed instructions to:
receive, from the first web server system, and storing data corresponding to a plurality of user accounts for the first web server system;
wherein the facilitate the transfer of relevant data further comprises provide particular stored data associated with the client and the first web server system to the second web server system and wherein the particular stored data is provided in an inline frame element (iframe) or providing particular stored client data associated with the client and the first web server system to the client to facilitate submission of the particular stored data to the second web server system from the client.

20. The system of claim 16, wherein the processors are further configured to be capable of executing the stored programmed instructions to:
receive, from the first web server system, and storing login data corresponding to a plurality of user accounts for the first web server system;
wherein the facilitate the transfer of relevant data comprises obtaining particular data from the first web server system using particular login data corresponding to the client.

* * * * *